(12) United States Patent
Anderson et al.

(10) Patent No.: US 7,046,789 B1
(45) Date of Patent: May 16, 2006

(54) TRACM-TASK AND RESOURCE AUTOMATION FOR CALL CENTER MANAGEMENT

(75) Inventors: Clare M. Anderson, Elmhurst, IL (US); Andrew J. Browne, Duluth, GA (US); Thomas M. Chamberlain, Sugar Grove, IL (US); Robert L. Cox, Jr., Frisco, TX (US); Michael P. Walsh, Dallas, TX (US)

(73) Assignee: Aspect Software, Incc, Westford, MA (US)

( * ) Notice: Subject to any disclaimer, the term of this patent is extended or adjusted under 35 U.S.C. 154(b) by 0 days.

(21) Appl. No.: 09/431,017

(22) Filed: Nov. 1, 1999

(51) Int. Cl.
*H04M 5/00* (2006.01)

(52) U.S. Cl. .......................... 379/265.01; 379/265.02; 379/265.06; 379/265.08; 379/265.11; 379/266.01; 379/266.07; 379/309

(58) Field of Classification Search ........... 379/265.01, 379/265.02, 265.06, 265.08, 265.11, 266.01, 379/266.07, 309
See application file for complete search history.

(56) References Cited

U.S. PATENT DOCUMENTS

| | | | |
|---|---|---|---|
| 5,289,368 A * | 2/1994 | Jordan et al. .......... | 379/112.01 |
| 5,381,470 A | 1/1995 | Cambray et al. ........... | 379/216 |
| 5,465,286 A * | 11/1995 | Clare et al. .............. | 379/32.04 |
| 5,592,543 A | 1/1997 | Smith et al. ................ | 379/265 |
| 5,594,791 A * | 1/1997 | Szlam et al. ........... | 379/265.09 |
| 5,784,452 A * | 7/1998 | Carney .................. | 379/265.06 |
| 6,526,397 B1 * | 2/2003 | Chee et al. .................... | 707/1 |

* cited by examiner

Primary Examiner—Ahmad F. Matar
Assistant Examiner—Quynh H. Nguyen
(74) Attorney, Agent, or Firm—Bourgue & Assoc.

(57) ABSTRACT

A relationship call center management system and method is used in a call center by a call center manager or supervisor. The relationship management system and method permits call center resources to be grouped into relationship profiles. A relationship key field corresponding to the relationship profiles is then used to organize and display statistics within the call center. A strategy and action management system and method permits the user to build customized actions and to create strategy profiles including one or more user-defined goal thresholds and assigned actions to take place when the goal thresholds are met. A statistics display system presents the call center statistics in different user-defined views, for example, corresponding to one of the relationship profiles. The statistics display system also monitors the statistics and provides an indication to the user when the user-defined goal thresholds have not been met.

31 Claims, 22 Drawing Sheets

TRACM-TASK AND RESOURCE AUTOMATION FOR CALL CENTER MANAGEMENT

FIELD OF THE INVENTION

The present invention relates to telephone call centers and more particularly, relates to a system and method for managing a call center's task and resources using a relationship based system and method.

BACKGROUND OF THE INVENTION

A growing number of companies have begun using call centers to handle interactions or communications between customers and potential customers by way of telephone. These call centers provide inbound services, for example, to handle queries from customers to customer service representatives (CSR), and outbound services for managing outbound telephone calls to potential customers for telemarketing and to existing customers for collections, or blended inbound and outbound services. The size of these call centers have increased with companies recognizing the competitive advantage provided by such call centers.

Call centers have also implemented other means of communicating and interacting with customers or potential customers such as E-mail and internet chat, and are sometimes referred to as contact centers. The phrase call center is referred to herein as covering the traditional telephone call center as well as contact centers using other means of communication.

A typical call center 10, FIG. 1, includes a number of different resources. A telephony/communications system 12 establishes the telephony or other type of communication over telephone lines or trunks 14 or over the internet 16 or other type of data network. The telephony/communication system 12 can include standard telephony devices, such as a private branch exchange (PBX), an automatic call distributor (ACD), an interactive voice response (IVR), an automated or predictive dialer, as well as other devices for establishing telephony communications over trunk lines 14. Another example of a telephony device is the Digital Communications Server (DCS) available from Davox Corporation of Westford, Mass. The telephony/communication system 12 can also include an e-mail or web server or other devices for establishing communications over the internet 16.

Agent workstations 18 are used by agents or operators to handle the inbound and/or outbound telephone calls or other communications. Each of the agent workstations 18 includes a data terminal 20, such as a PC, for receiving and transmitting data and an audio communications device, such as a headset 22, for receiving and transmitting voice communications. One of the agent workstations 18 can act as a supervisor workstation to be used by a supervisor who oversees the agents and activities in the call center 10.

A host system 24 stores information pertaining to the customer, potential customer, or other contacted party. The host system 24 typically includes one or more databases of customer or potential customer information, such as customer records including customer name and telephone number, account information, and the like.

A call center management system 26 monitors and manages the call center activities, resources and overall performance and provides a call center manager with call center statistics. The call center management system 26 typically includes one or more servers using a WINDOWS 95/98 or NT operating system or a UNIX-based operating system and including software for managing the call center. One example of call center management software is available from Davox Corporation under the name SMART MANAGEMENT CENTER® (or RESOURCE AND PERFORMANCE MANAGER™). The components or resources of the call center 10 are typically interconnected using a local area network (LAN) 28, such as an ethernet.

According to one example of outbound calling using the call center 10, the management system 26 downloads a data file from the host database 24 and converts it to one or more call tables containing call records. A call table is typically associated with a particular application. The numbers in the call table are dialed, either at the request of an agent or automatically, for example, using a predictive dialer. The telephony/communication system 12 monitors the dialing and when an answer is detected, the voice is connected to the headset 22 of an appropriate agent at an agent workstation 18, while the corresponding customer record is automatically sent to the data terminal 20 at the available agent workstation 18. The call center management system 26 monitors the characteristics and availability of the agents and determines which of the agents is appropriate to handle the calls. The agent can then enter additional data pertaining to the customer and can record the results of the call. This sequence of events continues until all of the calls in the list are made and is often referred to as an outbound call campaign.

According to one example of inbound call handling in the call center 10, when an inbound call is received over one of the trunk lines 14, the ACD within the telephony/communication system 12 connects the inbound call to an agent headset 22 of an appropriate available agent. If no agents are currently available, the inbound call may be placed into an ACD queue until an agent is available. The management system 26 can determine which agent is available and appropriate, for example, based upon the purpose of the call, the language being used, or other attributes. The management system 26 also searches for information pertaining to the calling party, retrieves that information from the host system 24, and transfers that information to the PC 20 at the workstation 18 of the available agent.

As the call center performs the inbound and outbound services, the call center management system 26 monitors the activities and resources, such as how many calls have been made, how long is the average agent talk time, what is the status of the queue or the agent, the number of contacts made by each agent, and the like. The management system 26 also provides a graphical user interface, sometimes referred to as a call center console, to display these call center statistics to a viewer (e.g. the call center manager or supervisor) and to allow interaction with the call center operations. Existing call center management software, however, is limited in its ability to interpret data and create information pertaining to the call center resources, to take actions in response to that information, and to group and display that information according to selected resources in the call center.

These call center consoles attempt to take call center data and present it to the call center manager in a manner that is easy to understand and interpret. Using these existing call center consoles, however, the call center manager must interpret the data provided and respond with one or more actions. The current console presents data in a visual format but does not provide an interpretive view. For example, a manager or supervisor can see how many calls have resulted in a successful contact for each agent but cannot see at a glance which agents are meeting their contact per hour goals and which are not. In other words, the supervisor has to look at each agent's statistics, interpret the information, and make a decision.

Existing call center management systems also are capable of quantifying call center data and presenting it as information, for example, in standard telemarketing reports. In the existing systems, however, these reports are built based on an established definition of how the information should be quantified and presented. Every call center is managed differently, and standard reports typically do not meet all of the needs of a particular call center.

Accordingly, a needs exists for an interactive call center management system that permits a call center manager to define an interpretive view of the call center data and apply it to the console displays. A system is needed in which managers can define their strategies and goals and use that information to dynamically change the console view, for example, by building and assigning strategies to call center resources, such as queues, campaigns, agents and devices.

The best of the current call center consoles, such as the SMART MANAGEMENT CENTER® available from Davox, attempt to automate some of the system's actions in response to system occurrences. One example includes software available from Davox under the name ALERT MANAGER™. The ALERT MANAGER™ software permits a call center manager to specify a threshold for performance and have the system take an action or notify the manager when that threshold is not being met. This and other such action management systems include a predefined group of call center statistics but do not permit the manager to customize either the type of measurement of the specific action or series of actions to take place. Although the systems are capable of taking an action without intervention, these actions are simple reactions to singular predefined events, and the user typically cannot modify the events or add new events.

Accordingly, what is needed is a management system that provides an action strategy instead of simply taking a predefined action in response to a predefined event. A need exists for a management system in which call center managers can define an action or series of actions that should occur in response to information learned by the system, for example, by building and assigning a series of actions to call center events such as goal attainment, system event occurrence or time of day.

Existing management systems are also limited in the ability to group information, for example, pertaining to the resources in the call center. The SMART MANAGEMENT CENTER® software available from Davox Corporation permits customers to use workgroups to group information about agents and application groups to group client information pertaining to an application. This system, however, uses predefined categories and does not permit call center managers to define how call center resources, other than agents, should be grouped. Each element in a call center has a relationship to a physical system, staffing model and business object. Existing call center management software does not allow these relationships to be defined.

Accordingly, a system is needed in which call center managers have the ability to define relationships, for example, by building and assigning relationships to call center resources, such as queues, campaigns, agents and devices. A need further exists for a management system that can be incorporated into an existing call center console such as the RESOURCE AND PERFORMANCE MANAGER™ available from Davox Corporation, to enhance it with an interpretive and relational view and to add the ability to define action strategies, resulting in an interactive system instead of a static console view.

SUMMARY OF THE INVENTION

The present invention features a computer implemented method of managing a call center using relationships. The call center includes a plurality of resources for handling telephone calls and other communication contacts. According to the method, call center resource data corresponding to the resources within the call center is established. The resources are presented to the user, and user selections of selected resources are received. The selected resources are then assigned to a relationship profile. A relationship key field corresponding to the relationship profile is then assigned to the call center resources data for each of the selected resources assigned to the relationship profile. The relationship key field is used to manage the call center, for example, by controlling the views presenting call center data and by controlling the definition of call center strategies.

The call center resource data is preferably organized by function into a plurality of resource categories. The method can further include the step of presenting the resource categories to the user and receiving a user selection of a selected resource category. The resources within the selected resource category are then presented for selection by the user.

The present invention also features a computer-implemented method of managing strategies and actions in a call center. According to this method, action detail data defining generic actions that can be taken in the call center and goal data defining goals that can be set within the call center are established. The generic actions are presented to the user, at least one user selection of a selected generic action is received, and action detail data for the selected generic actions is displayed. User-defined action detail data specific to the call center is then received and added to the generic action detail data to create an available action.

According to this method, the goals defined by the goal data are presented to the user, and at least one user selection of a selected goal and at least one user-defined threshold for the selected goal are received. A user selection of at least one selected available action is then received and assigned to the user-defined threshold for the selected goal such that the selected available action occurs when the user-defined threshold is reached.

At least one user defined strategy threshold preferably includes multiple levels of user defined strategy thresholds, such as an optimization minimum, an optimization realization, and an optimization maximum. At least one of the available actions is selected and as signed to each of the user defined strategy thresholds. A plurality of selected goals, user defined thresholds, and selected available actions are preferably received and assigned to create at least one strategy profile. A library of strategy profiles can be created such that the user can select a strategy profile from the library depending upon a desired strategy to be implemented in the call center.

The present invention also features a method of monitoring and presenting call center statistics. According to this method, a plurality of relationship profiles defining a plurality of relationships between call center resources is established, and a plurality of call center strategy profiles defining a plurality of call center strategies is established. Each of the call center strategies include a plurality of goals having at last one user defined strategy threshold. The method also includes receiving call center statistic data pertaining to the call center resources. A plurality of statistics display options corresponding to the resource relationship profiles are presented to the user. The call center statistics data pertaining to the call center resources assigned to the resource relationship profile corresponding to a selected statistics display option selected by a user is then displayed to the user. When the user defined strategy threshold of one of the plurality of goals has not been reached, an indication is provided to the user.

The call center statistic data can include call center queue statistics data or call center agent statistics data. Queue statistics data is organized an displayed according to call center tasks and further according to task classes within each of the call center tasks. Agent statistics data is organized and displayed according to individual agents and further according to task classes.

A plurality of task statistics viewing options corresponding to each of the task classes are presented to the user such that contact statistics data within the task classes corresponding to a selected task statistics viewing option is displayed. The method can also include the step of presenting the user with task statistic viewing option preferences, allowing the user to create a user-defined task statistics viewing option.

According to one aspect of the method, the indication provided includes a change in color of a display region containing the call center statistics data corresponding to one of the goals in which the user defined threshold has not been reached. According to another aspect, the method includes the step of presenting the user with a plurality of view formats pertaining to the level of detail and format of the call center statistics data to be displayed. View formats include a summary statistics format and a detailed graphical statistics format.

The present invention also features call center management systems for performing the methods described above.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
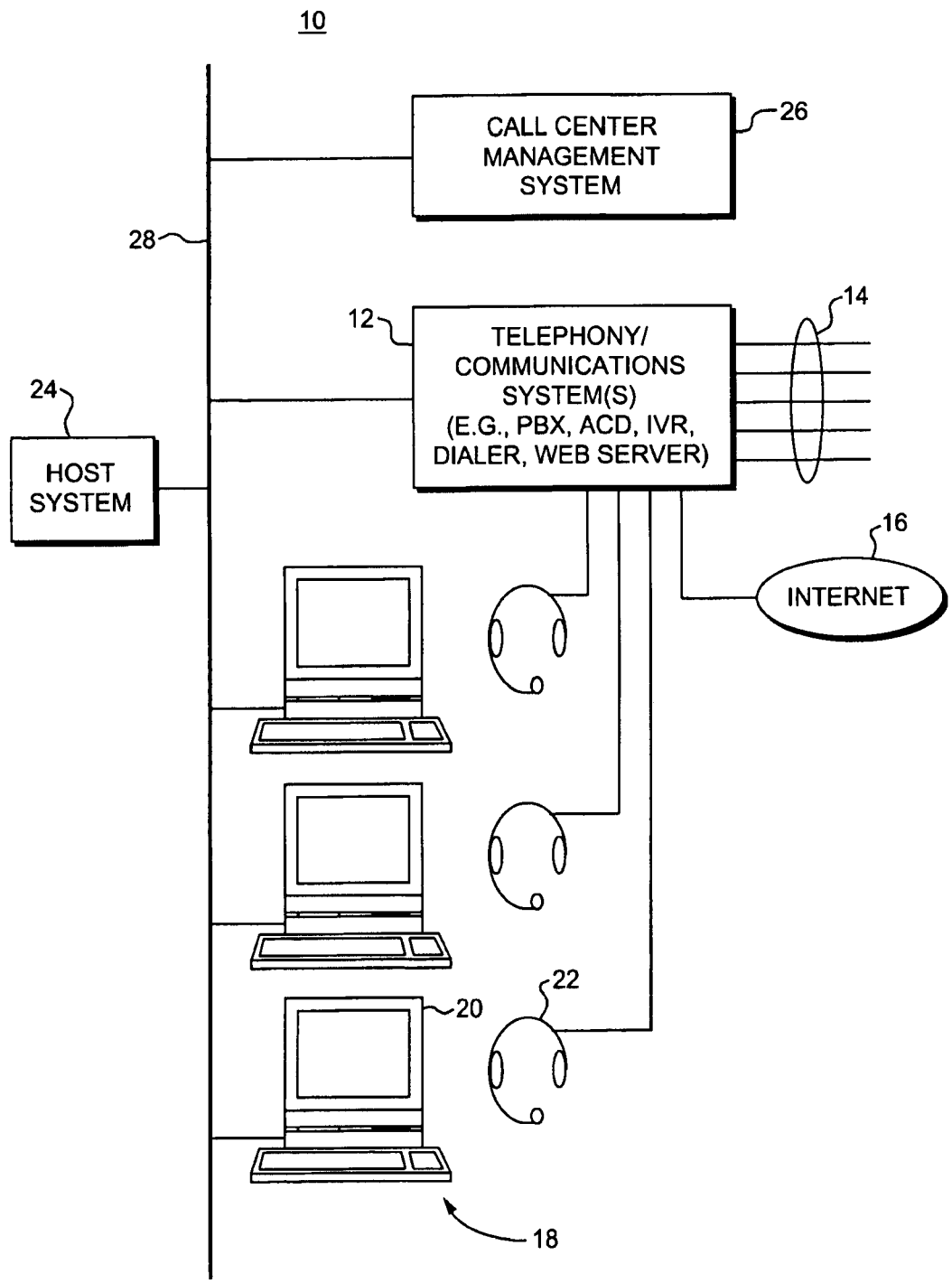
FIG. 1 is a schematic block diagram of a call center, according to the prior art on which can be practiced the present invention.
Figure 2:
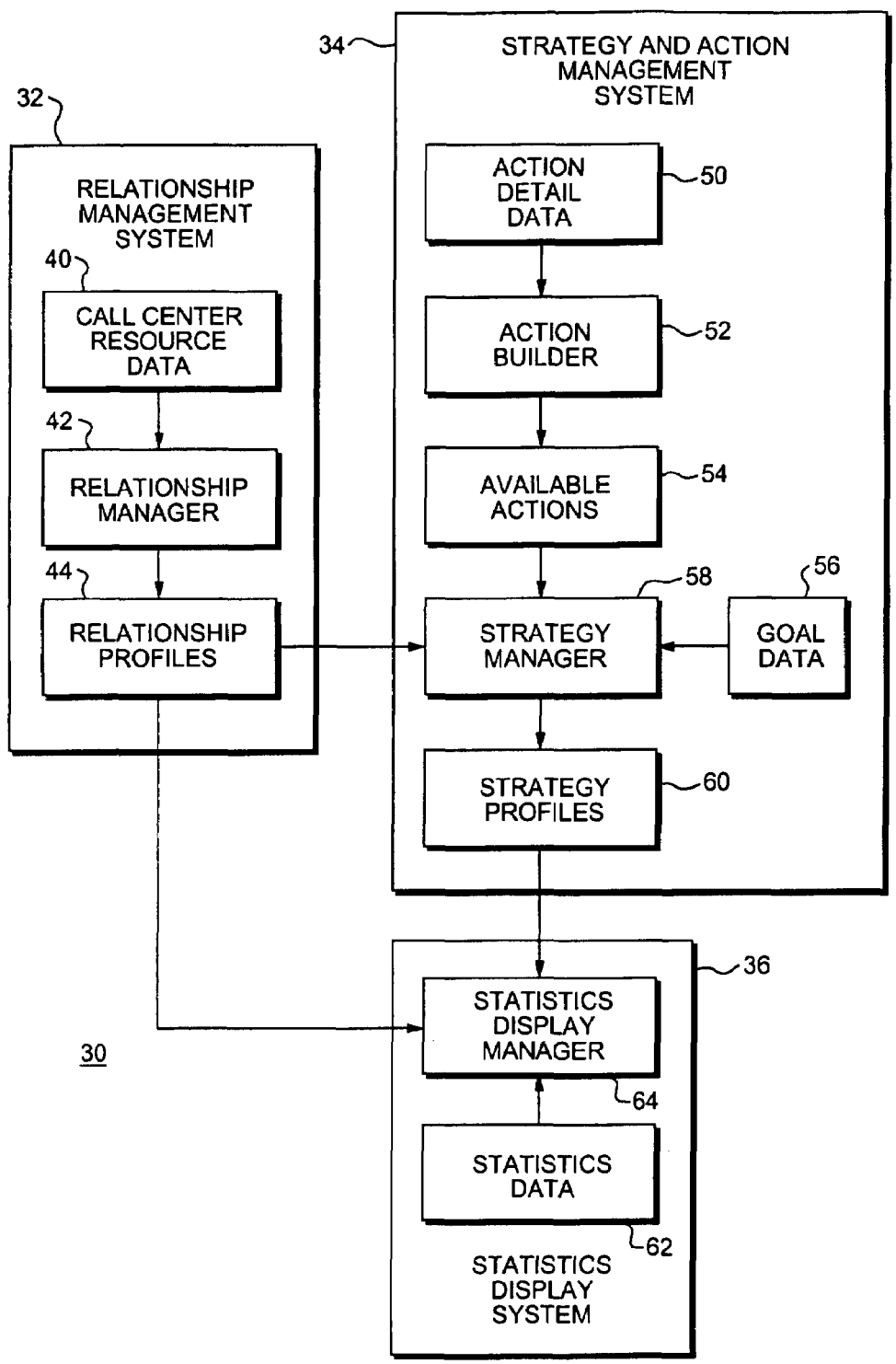
FIG. 2 is a functional block diagram of a call center management system, according to the present invention.

The call center management system 30, FIG. 2, according to the present invention, includes a relationship management system 32, a strategy and action management system 34, and a statistics monitoring and display system 36. The systems 32, 34, 36 are preferably implemented as software on one or more computers in a call center 10 (FIG. 1). In one example, one or more of the systems 32, 34, 36 are incorporated into an existing call center management system 26 such as the software available from Davox Corporation under the name RESOURCE AND PERFORMANCE MANAGER and running on a PC platform in a WINDOWS 95/98 or WINDOWS NT operating system environment. One or more of the systems 32, 34, and 36 can also be used with other types of call centers and call center management software operating on other hardware platforms with other types of operating systems. The call center management system 30 of the present invention is typically used by a call center manager, supervisor, or administrator, collectively referred to herein as the user.

The relationship management system 32 allows call center resources to be grouped such that the user can see the results and activities of the call center as they relate to the resources in each group. Call center resources include agents, trunk lines, workgroups, devices, queues, applications, campaigns, and call tables as well as any other call center resource not yet defined. The relationship management system 32 includes call center resource data 40 defining each of the resources available in the call center. A relationship manager 42 provides a graphical user interface for building and defining relationships by allowing the user to select resources defined by the call center resource data 40, as will be described in greater detail below. The relationship manager 42 also permits the user to save the combinations of selected resources as relationship profiles 44, which can be modified using the relationship manager 42.

The strategy and action management system 34 allows the user to define the corresponding actions that should be taken when information is learned and as conditions change in the call center. The strategy and action management system 34 includes predefined action detail data 50 defining generic actions that can be taken in the call center. An action builder 52 provides a graphical user interface that allows the user to select the generic actions defined by the action detail data 50 and customize the generic actions by adding action details specific to that call center. The action builder 52 thereby builds a series of available actions 54 that can take place in the system, for example, as part of a strategy, as will be described in greater detail below.

The strategy and action management system 34 also provides the ability to define strategies such that the available actions 54 can take place when a goal or threshold is being approached. The strategy and action management system 34 includes goal data 56 defining various goals to be achieved within the call center. A strategy manager 58 provides a graphical user interface for allowing the user to set one or more thresholds corresponding to the goals defined by the goal data 56 and for assigning one or more of the available actions 54 to the goal thresholds. The strategy manager also permits the user to save the goal thresholds and assigned actions as strategy profiles 60. The strategy manager 56 can also use the relationship profiles 44 to define goals and create strategy profiles 60 that apply to a specific relationship profile.

A statistics display system 36 monitors and displays call center statistics in a user-defined format. The statistics monitoring and display system includes statistics data 62 collected from the resources throughout the call center. A statistics display manager 64 monitors the statistics data and organizes and presents the statistics data 62 based upon the relationship profiles 44 and strategy profiles 60. The statistics display manager 164 can display the statistics pertaining to a selected user-defined relationship profile 44 and provides an indication when a user-defined threshold defined by one of the strategy profiles 60 has been reached, as will be described in greater detail below.

Figure 3:
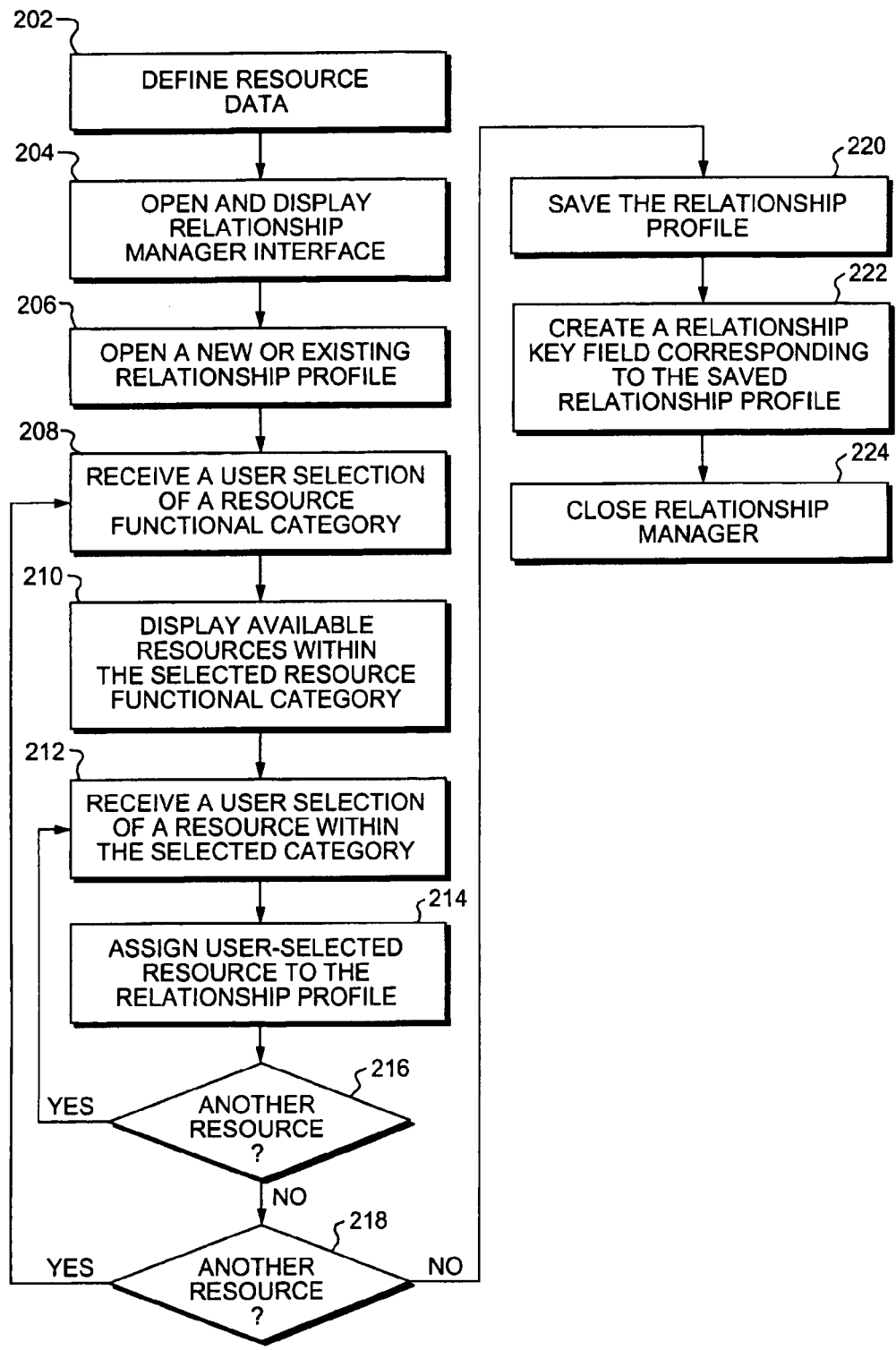
FIG. 3 is a flow chart illustrating a method of creating relationship profiles for use in managing the call center, according to the present invention.

One method of managing relationships in a call center, according to the present invention, is illustrated in FIG. 3. According to this method, the resources within the call center are identified and resource data 40 is collected, step 202. In one example, a set of system administration tools can be used to define resources. These tools typically include a series of graphical screens to permit the setup of the individual device resources that are applicable to the system. A separate interface can be used for each device type, such as telephony (e.g., PBX, ACD and telephones), IVR, Voice Recording and external devices (e.g., e-mail, web and fax servers). Agent resources can be defined through an agent management interface.

When the user activates the relationship manager 42, the relationship manager 42 opens and displays the graphical user interface, for example, on the call center manager's data terminal, step 204. The relationship manager 42 also retrieves and presents the call center resource data 40 to the user in the graphical user interface.

Figure 8:
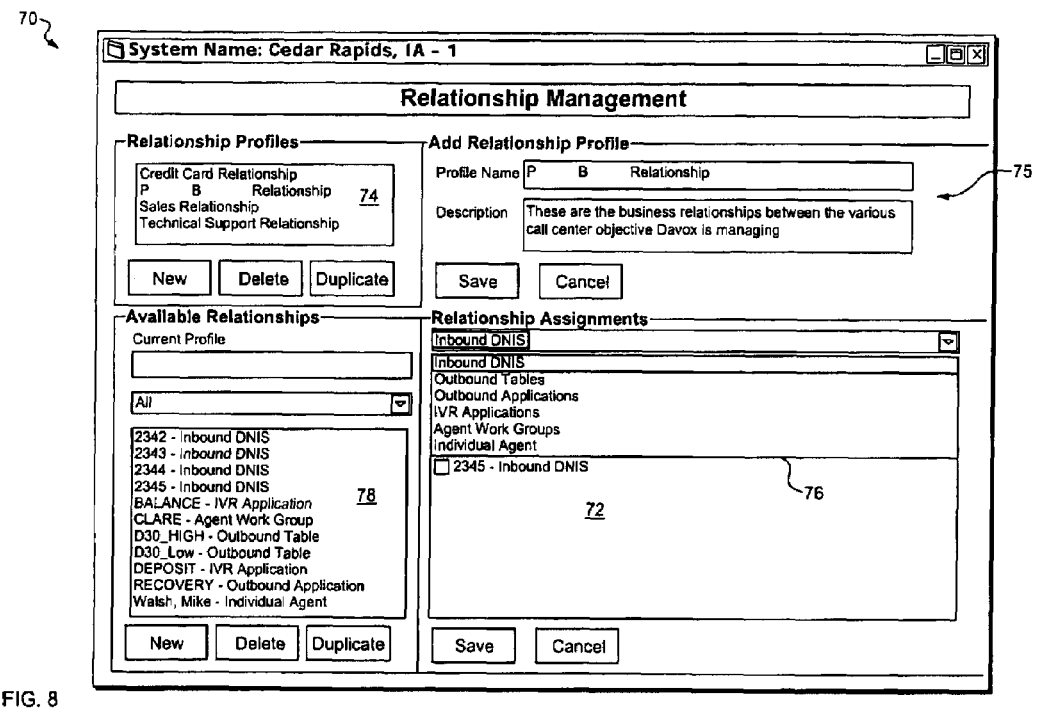
FIG. 8 is a screen shot of the user interface for the relationship manager, according to one embodiment of the present invention.

One example of the graphical user interface generated by the relationship manager 42 is a relationship management window 70, FIG. 8, having a relationship assignment region 72 that displays the available call center resources defined by the resource data 40. The available resources are preferably organized and displayed according to resource functional categories. Although the exemplary functional categories are shown as Inbound DNIS, Outbound Tables, Outbound Applications, IVR Applications, Agent Workgroups, and Individual Agent, other functional categories are contemplated.

The user can then open an existing relationship profile or add a new relationship profile, step 206. Each relationship profile can include agents, workgroups, devices, queues, applications, campaigns and call tables, as well as other resources not yet defined. In the exemplary embodiment, the existing relationship profiles are displayed in a relationship profile region 74 of the relationship management window 70. The new relationship profiles are added in an add relationship profile region 75 of the relationship management window 70 by naming the relationship profile and providing a description of the relationship profile. When the relationship manager 42 receives a user selection of a resource functional category, step 208, the available resources within the selected resource functional category are displayed, step 210. In the exemplary embodiment, the resource functional categories are presented to the user in a drop down list 76.

When a user selection of one or more resources within the selected resource functional category is received, step 212, the user selected resource is assigned to the current (new or existing) profile, step 214. In the exemplary embodiment, the resources that have been assigned to the current profile are displayed in an available relationships region 78 of the window 70. The steps of receiving and assigning user-selected resources to the relationship profile can be repeated until the user does not wish to assign any additional resources within that category, step 216. The user can also select another resource functional category, step 218, (e.g., from the drop down list 76) and the steps of receiving and assigning user selected resources within that category can also be repeated until the user has selected and assigned any number of resources to the current profile. The resources can also be organized, displayed and selected using other methods and formats.

When the user is finished creating or modifying the relationship profile, the relationship profile is saved, step 220, and a relationship key field corresponding to the saved relationship profile is created and associated with the resource data for the resources assigned to that relationship, step 222. The relationship key field can be used to sort call center data and to control the views, to define strategies, and to create reports, as will be described in greater detail below. The user-defined relationship key field also provides the ability to group information about resources within an individual call center at a particular site and also to extend the grouping functionality to multiple call centers across an entire enterprise. After creating any number of relationship profiles, the user can exit the relationships manager 42, step 224, for example, by closing the relationship management window 70.

Relationship management system 32 of the present invention allows the user to create a hierarchy of relationships within the call center. Corporations, for example, could have a customer service department with all telephony functions within one call center or distributed across many call centers. Within the customer service department, there may be several departments, such as private label, core product, special offerings and acquisitions. Certain call center resources (e.g., agents, queues, campaigns, etc.) may be associated with these departments. The relationship management system 32 allows resource relationships to be defined at each of these levels and across multiple call centers.

Figure 4:
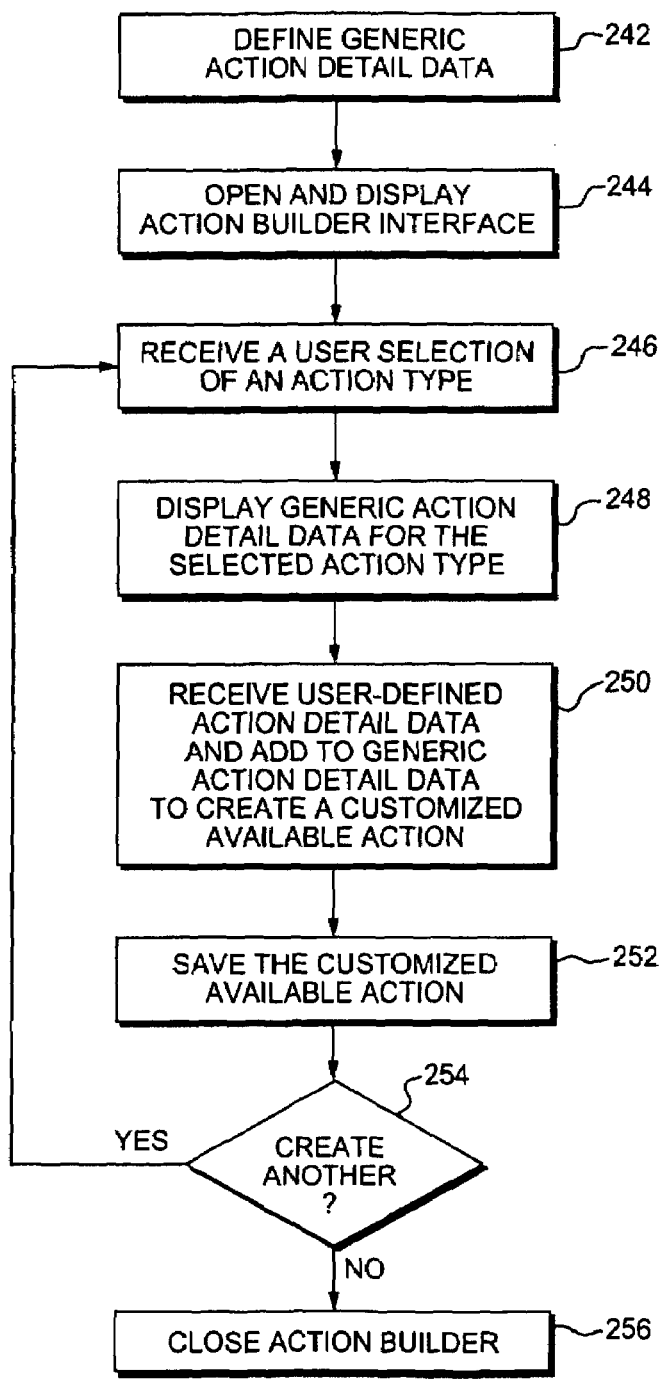
FIG. 4 is a flow chart illustrating a method of creating available actions for use in managing the call center, according to the present invention.
Figure 9:
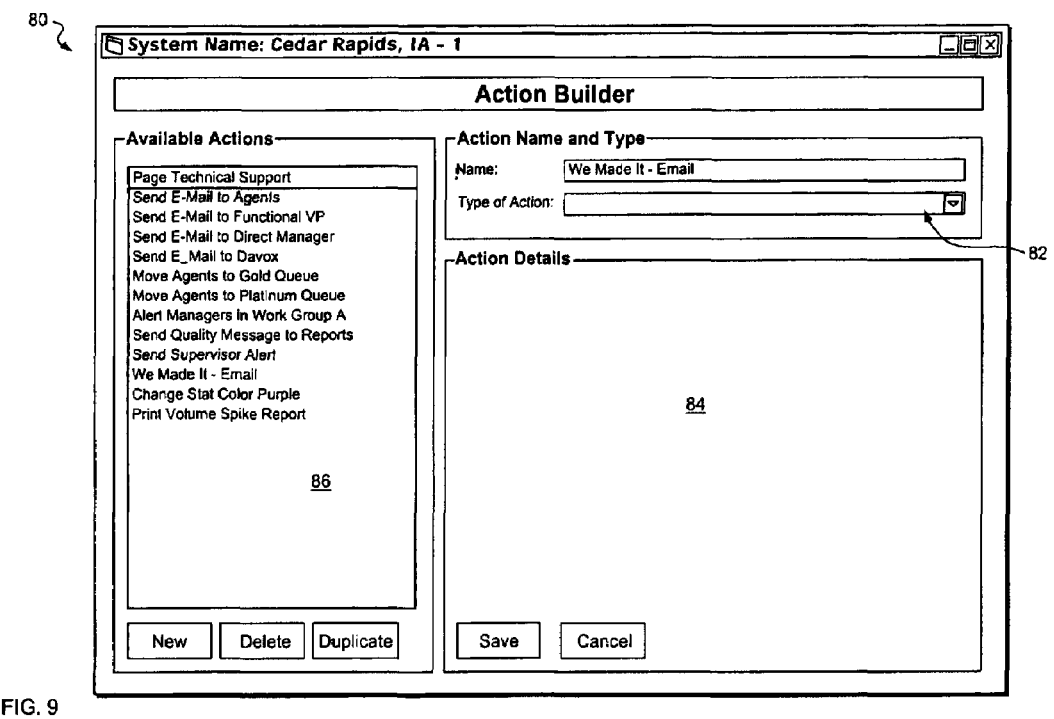
FIG. 9 is a screen shot of the user interface for the action builder, according to one embodiment of the present invention.

One method of building actions in a call center, according to the present invention, is illustrated in FIG. 4. According to this method, generic call center actions are initially defined to establish the predefined generic action detail data 50, step 242. When the user activates the action builder 52, the action builder 52 opens and displays a graphical user interface, step 244. An example of the action builder interface is an action builder window 80, FIG. 9. The action builder window 80 presents the types of generic actions to the user, for example, in a drop down list 82. When a user selection of an action type is received, step 246, the generic action detail data for the selected action type is displayed, step 248, for example, in an action details region 84 of the action builder window 80. User-defined action detail data is then received, for example, in the action details region 84 and is added to the generic action detail data, to create a customized available action, step 250.

Examples of actions that can be defined in the call center software available from Davox Corporation include but are not limited to: a send messages action where the user specifies where the message is to be sent (e.g., the agent(s) or workgroup(s)); the E-mail notification action where the user specifies the E-mail address; the pages notification action where the user specifies a list of phone numbers; the purge logs action; the move resources to queue action where the user specifies the origin queue and the destination queue; the recycle device action where the user specifies the device (e.g., IVR, CTI, voice recording); the set statistic color action where the user specifies the color; the notification action where the user specifies the screen event; the log action where the user specifies an exception to send to the event log; the combination termination codes action where the user selects multiple termination codes and totals them together for a single display, and the automation script action where the user assigns an automation script to run.

The customized available action can be saved, step 252, and also can be displayed in an available action region 86 of the action builder window 80. These steps can be repeated to create any number of available actions, step 254. Once the user has created the desired available actions, the user can exit the action builder 52, step 256, for example, by closing the action builder window 80. The available actions 54 can later be selected and assigned using the strategy manager, as will be described in greater detail below.

In one example, if the call center manager or administrator wants to define an action in which agents are moved from one inbound queue to another inbound queue when a certain event occurs, the administrator selects the move resources to queue type of generic action. The administrator then enters the specific details pertaining to the origin queue and the destination queue specific to the particular call center.

Figure 5:
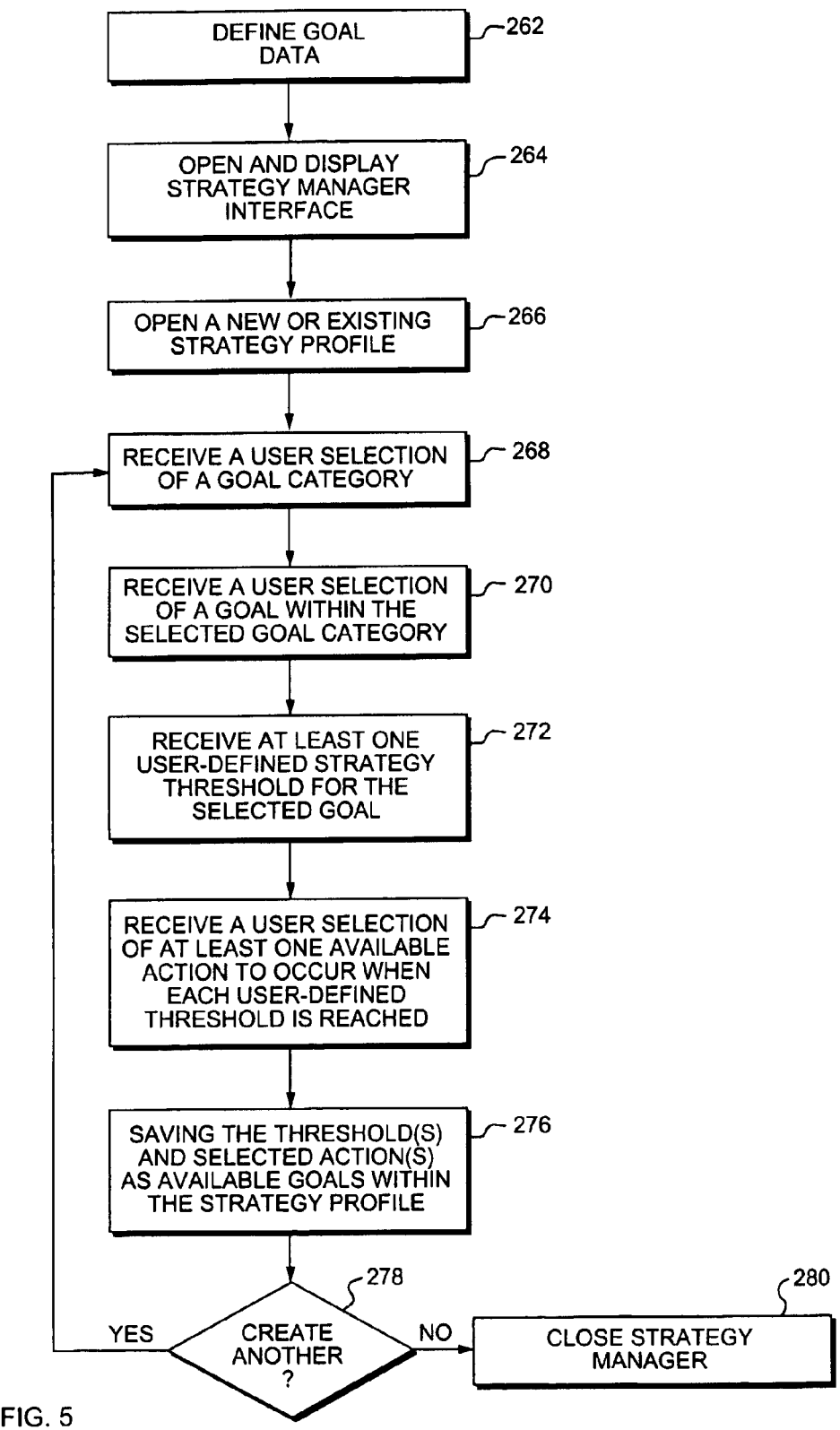
FIG. 5 is a flow chart illustrating a method of creating strategy profiles for use in managing the call center, according to the present invention.

One method of managing strategies within a call center, according to the present invention, is illustrated in FIG. 5. According to this method, the strategies or goals are initially defined to establish the predefined goal data 56, step 262. When activated by the user, the strategy manager 58 opens and displays a graphical user interface, step 264.

Figure 10:
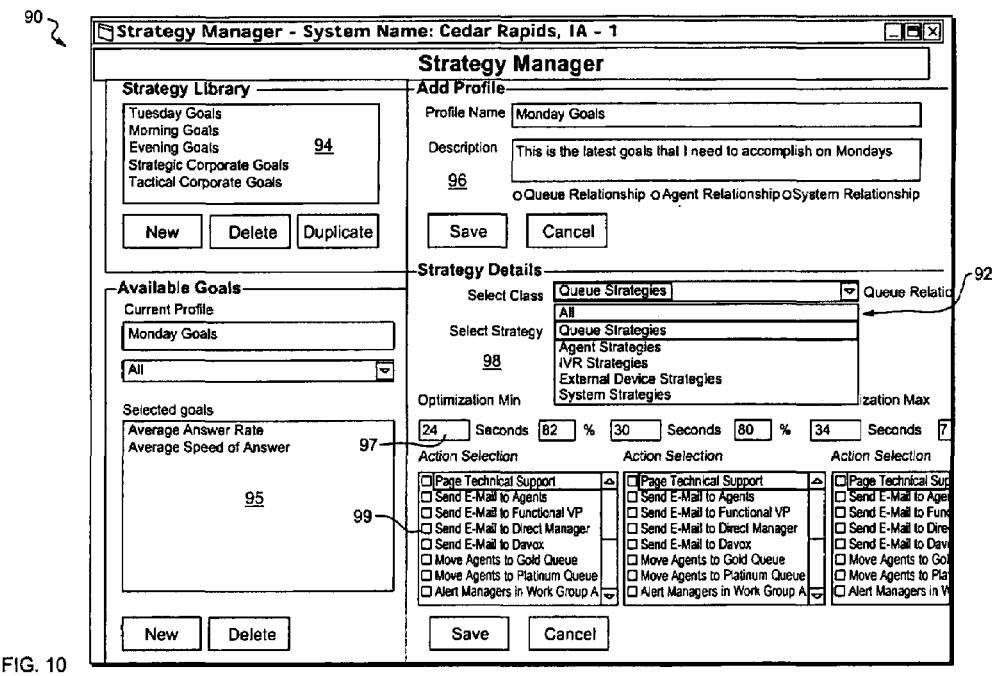
FIG. 10 is a screen shot of the user interface for the strategy manager, according to one embodiment of the present invention.

One example of the graphical user interface is a strategy manager window 90, FIG. 10. The strategy manager window 90 presents the predefined strategies or goals to the user, for example, in one or more drop down lists 92. The user can open an existing strategy profile or add a new strategy profile, 266. In the exemplary embodiment, the existing strategy profiles are displayed in a strategy library region 94 of the strategy manager window 90. New profiles are added in an add profile region 96 of the strategy manager window 90 by naming the profile and providing a brief description of the profile.

The strategies or goals are preferably organized according to goal classes or categories including, but not limited to, system events, service level, volumes, agent, devices, and time of day. Examples of system events goals include Download Process, Upload Process, and System Backup. Examples of service level goals include Answer Rate, Average Speed Of Answer, Calls Currently In Queue, Longest Time In Queue, Average Time In Queue, Calls Handled In X Seconds, Average Idle Time, Average Wrap Time, Average Talk Time, and Average Hold Time (Agent). Examples of volumes goals include Total Calls, Agents Currently Logged Into Queue, Calls Abandoned, Calls Transferred, Calls Abandoned From Queue, Calls Abandoned While Ringing, Calls Abandoned From Hold, and Calls Handled By IVR. Examples of agent goals include Individual Term Code Results, Combination Term Code Results, Manual Make Calls, Actual Hold Time, Actual Talk Time, Actual Wrap Time, Actual Idle Time, Average Hold Time, Average Talk Time, Average Wrap Time, Average Idle Time, Conferences, Transfers, and Abandons On Hold. Examples of devices goals include CTI Link, IVR Link, Voice Recording, DCS, Customer dbase Link, Desktops, Email Server Link, Web Server Link, and Fax Server Link.

The user selects a goal category, step 268, and then selects a goal within the selected goal category, step 270. The user then defines at least one strategy threshold for the selected goal, step 272. In the exemplary embodiment, the goals are selected and the thresholds are defined in a strategy details region 98 of the strategy manager window. The goals are selected using the drop down lists 92 and the threshold values are entered in the appropriate box 97. Preferably, multiple thresholds can be defined for each selected goal, such as an optimization minimum, and optimization realization, and an optimization maximum.

For each of the one or more strategy thresholds defined by the user, the user can select one or more available actions 54, as defined using the action builder 52, to occur when each user-defined threshold is reached, step 274. In the exemplary embodiment, the available actions 54 are listed in action selection regions 99. By defining multiple thresholds for a selected goal and assigning one or more available actions to each threshold, the user can define a series of actions to take place as conditions change in the call center, for example, as the goal is approached, as the goal is realized, and as the goal is exceeded.

In one example, a call center has an Average Speed Of Answer (ASA) goal of 20 seconds. If the ASA drops below 10 seconds, there are too many agents logged into the queue resulting in a high agent idle time. The administrator can thus set an optimization minimum goal at ten seconds such that, if the ASA dropped below 10 seconds, sequential actions could take place, for example, send a page to management and move agents from one inbound queue to another. The administrator can also define an optimization maximum goal, for example, of 28 seconds, and select the appropriate actions for the optimization maximum goal.

The user defined thresholds and selected actions are then saved as available goals within the strategy profile, step 276. In the exemplary embodiment, the available goals for a selected strategy profile are displayed in an available goals region 95 of the strategy manager window 90. The user can then select and define additional goals for that strategy profile as desired, step 278. When the user has finished defining or modifying one or more strategy profiles, the user can exit the strategy manager 58, step 280, for example, by closing the strategy manager window 90.

The strategy profiles can also be assigned, for example, based upon a day, a time of day, or a relationship profile. When a strategy profile is assigned to a relationship profile, the goals defined within that strategy profile will apply to the resources within to the assigned relationship profile. For example, if several queues are defined as belonging to a "customer service gold" relationship profile, a "customer service gold" strategy profile can be created with goals (e.g., e-mail returned within 4 hrs., calls answered within 8 sec., and faxes returned within 20 min.) that apply to the queues within the "customer service gold" relationship profile. If a new queue is added to the relationship profile, the new queue will have the same strategy assigned to that relationship profile. If the overall strategy assigned to the relationship profile is not appropriate for a particular resource within the relationship profile, an individual strategy can be devined for that resource.

The strategy manager 58 can also define strategy profiles that apply to resources across different relationships. For example, a "Monday" strategy profile can be defined that gives inbound phone calls the highest priority regardless of whether the inbound queues belong to the "customer service gold" relationship profile. As described in greater detail below, the statistics can then be viewed according to the relationship profile, thereby allowing the user to see how the "Monday" strategy profile affects the queues assigned to the "customer service gold" relationship profile. This permits a multi-dimensional view of the contact center.

Figure 6:
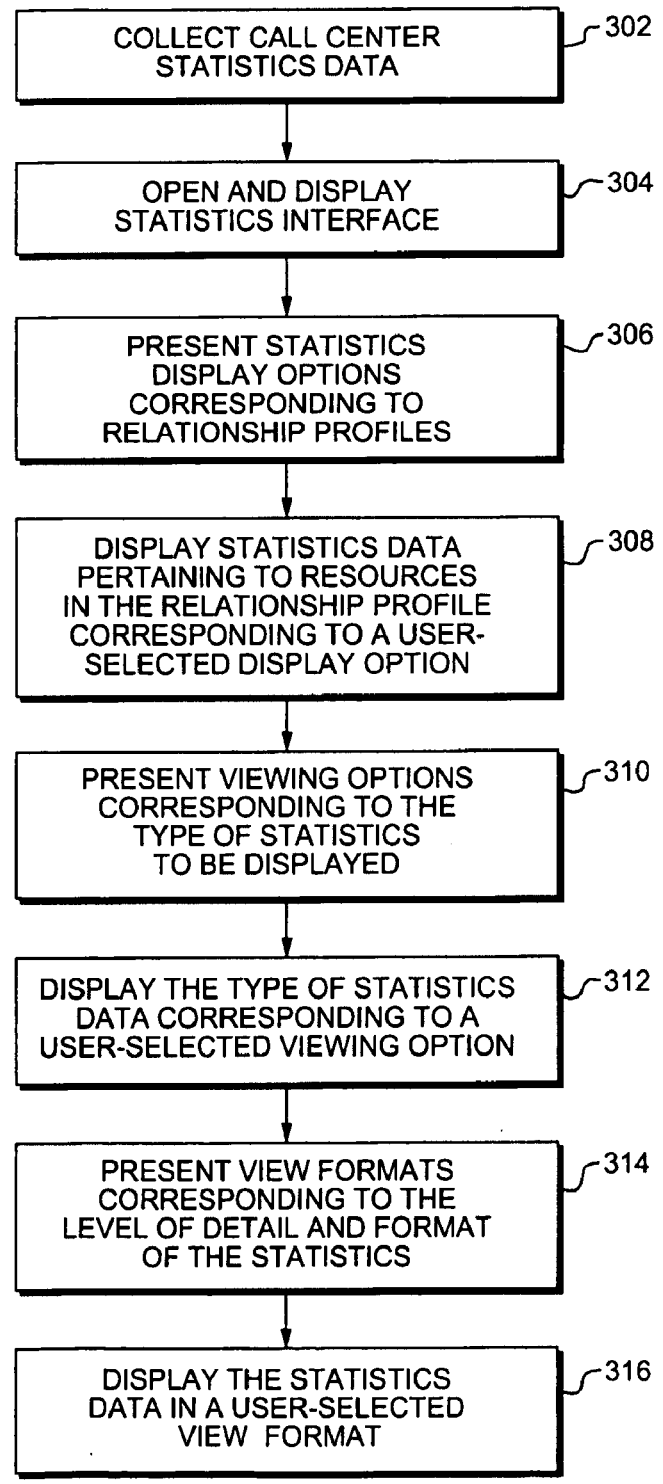
FIG. 6 is a flow chart illustrating a method of displaying call center statistics using defined relationship profiles, according to the present invention.
Figure 7:
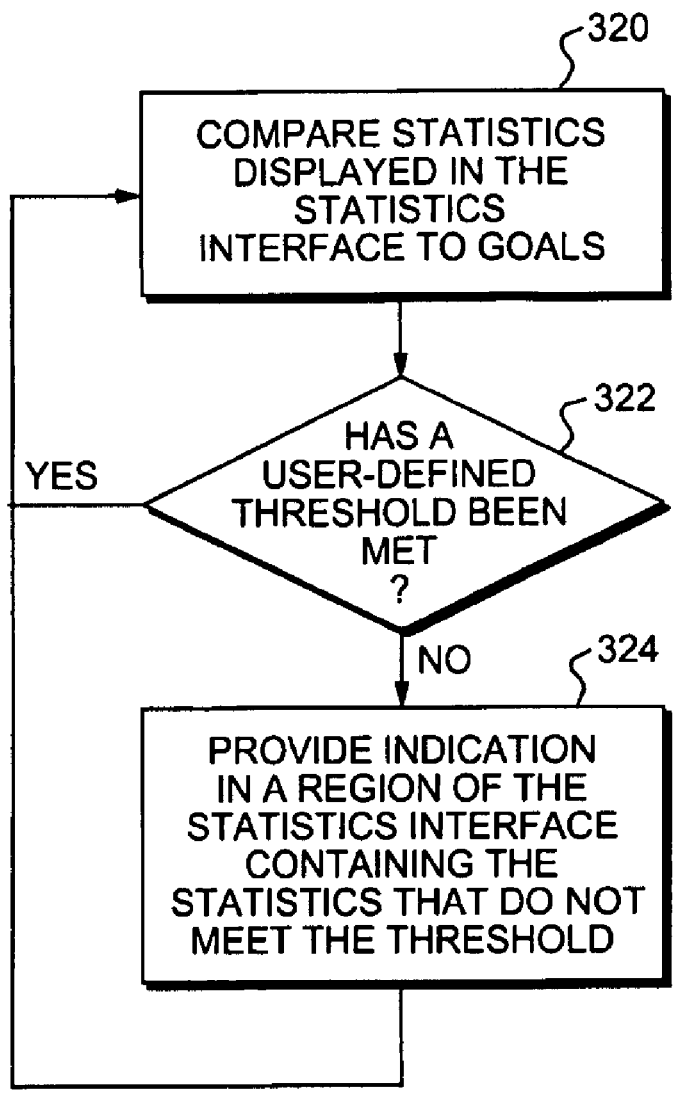
FIG. 7 is a flow chart illustrating a method of displaying call center statistics using defined strategy profiles, according to the present invention.

One method of organizing and presenting call center statistics, according to the present invention, is shown in FIGS. 6 and 7. According to this method, the call center statistics data 62 is collected, step 302, for example, using conventional techniques for collecting statistics in a call center. Upon activation by a user, the statistics display manager 64 opens and displays a graphical user interface, step 304. According to the present invention, two basic types of statistics can be displayed—queue statistics and agent statistics.

According to the exemplary embodiment, the graphical user interface includes one or more queue statistics windows or screens 100, 110, 112, FIGS. 11–17, for displaying queue statistics in different formats and levels of detail. A summary queue statistics screen 100 displays statistics according to call center tasks, for example, inbound, outbound, e-mail and web chat, and permits the user to view the overall performance of the call center. The statistics data corresponding to the call center tasks are displayed in appropriate call center task regions 102, for example, in tabular format, within the summary queue statistics screen 100. The statistics can include current statistics updated in regular time intervals (e.g., 1 min.) as well as daily statistics accumulated throughout the day and updated daily.

According to the exemplary embodiment, the graphical user interface also includes one or more agent statistics windows or screens 120, FIGS. 18–22, for displaying agent statistics in various formats and levels of detail. An agent statistics summary screen 120 permits the user to view agent activity. The agent statistics are displayed in an agent statistics display region 122, for example, in tabular format. The agent statistics can be displayed as per agent hour statistics and daily agent statistics.

The method of organizing and presenting the queue or agent statistics includes presenting statistics display options corresponding to the relationship profiles 44, step 306. When the user selects a relationship profile display option, statistics data pertaining to the resources assigned to the relationship profile corresponding to the user-selected display option are displayed, step 308. For example, the statistics display manager 64 sorts the statistics data using the relationship key field corresponding to the selected relationship profile display option and displays the corresponding statistics data.

In the exemplary embodiment, the summary queue statistics screen 100 provides a drop down menu 104 that allows the user to select the display option corresponding to one of the relationship profiles 44. If the relationship profile display option is selected, statistics pertaining to the resources (e.g., queues or campaigns) assigned to that relationship profile will be displayed within the appropriate call center task region 102. Other display options include workgroups, call center tasks, and the entire call center activity.

The exemplary summary agent statistics screen 120 also provides a drop down menu 124 that allows the user to select a display option based upon a relationship profile, a workgroup, or agents assigned to specific tasks (e.g., inbound, outbound, e-mail, and web chat). If a relationship profile display option is selected, statistics for the agents assigned to that relationship profile will be displayed within the agent statistics display region 124.

The method also includes presenting viewing options corresponding to the type of statistics to be displayed, step 310. When the user selects a viewing option, the type of statistics data corresponding to a user-selected viewing option is displayed, step 312. In the exemplary embodiments, the queue statistics and agent statistics are organized according to categories or classes, and the viewing options correspond to the categories or classes.

In the exemplary embodiment of the summary queue statistics screen 100, the user can select a viewing option corresponding to one of the classes from a drop down list 106 within each of the task regions 102. The queue statistics classes include, but are not limited to, service level statistics, volume statistics, agent queue statistics, results statistics, routing statistics, IVR statistics, and user defined preferences. Examples of the queue statistics within each of the classes are as follows:

Service Level Statistics

Service Level—Percentage of calls answered within a predefined number of seconds (near real time interval).

Number of Calls Abandoned from Queue—Number of calls that reached the queue and the customer hung up (real time interval).

Percent of Calls Abandoned From Queue—Number of calls that reached the queue and the customer hung up/Total calls (real time interval).

Percent of Calls Abandoned While Ringing—Number of calls that the customer hung up while the phone was ringing (real time interval).

Number of Calls Abandoned While On Hold—Number of calls that the agent put on hold and the customer hung up (real time interval).

Percent of Calls While On Hold—Number of calls that the agent put on hold and the customer hung up/Total calls (real time interval).

Number of Calls Defaulted—Number of calls in a queue that took the default route (near real time interval).

Percent of Calls Defaulted—Number of calls in queue that took the default route/Total calls (near real time interval).

Average Speed Of Answer—Time from PBX arrival to agent answer for all calls/Total calls (real time interval).

Age of Oldest Call In Seconds/Minutes—Time of call currently in queue for the longest period of time (real time interval).

Average Time In Queue—Only track for calls that are in a queue longer than 1 second—Time from queue arrival to agent answer for all calls/Total calls (real time interval).

Volume Statistics

Total Calls—Number of calls that were delivered to the queue (near real time interval).

Number of Agent Transfers Within Queue—Number of calls transferred within the same queue (near real time interval).

Percent of Agent Transfers Within Queue—Number of calls transferred within the same queue/Total calls (near real time interval).

Number of Agent Transfers Out Of The Queue—Number of calls transferred outside the queue the call is currently in (near real time interval).

Percent of Agent Transfers Out Of Queue—Number of calls transferred outside the queue the call is currently in/Total calls (near real time interval).

Number of Agent Transfers Off Premise—Number of calls that are transferred to a number outside the switch (near real time interval).

Percent of Agent Transferred Off Premise—Number of calls that are transferred to a number outside the switch/Total calls (near real time interval).

Number of Calls In Queue—Total number of calls currently in queue (real time interval).

Agent Queue Statistics

Average Agent Talk Time—Time from call answer to call hang up for all calls/Total calls (near real time interval).

Average Agent Wrap Time (After Call Work)—Time from call hang up to receipt of termination code for all calls/Total calls (near real time interval).

Average Agent Idle (Ready) Time—Time agents in ready state not on a call for all calls/Total calls (near real time interval).

Number of Agents Currently Logged In—Number of agents logged in to this queue (real time interval).

Number of Agents In Idle (Ready) State—Number of agents logged in and ready to take calls (real time interval).

Number of Agents In Talk State (After Call Work)—Number of agents currently on a call (real time interval).

Number of Agents in Wrap (Busy) State—Number of agents currently in the after call work state (real time interval).

Number of Agents Allocated To Blend—Number of agents not available to this application because they have been systematically moved to a blend application (real time interval).

Percent of Agents Allocated To Blend—Number of agents not available to this application because they have been systematically moved to a blend application/Total agents (near real time interval).

Results

Conversion Rate—Number of calls that result in 'N's termination codes, where 'N's is defined by the customer/Total calls—'N's result codes (near real time interval).

Total 'N' Results—Number of calls that result in 'N's termination code, where 'N's is defined by the customer. 'N' can be one or multiple result codes. Groupings to be defined by the customer (real time interval).

'N' Results Per Agent Hour—Total results/Agent hours (near real time interval).

Total Dollars—Dollars assigned to total results. Dollars will be definable by the customer by result code. The field will be populated at call completion by the agent client software (near real time interval).

Dollars Per Agent Hour—Total dollars/Agent hours (near real time interval).

Routing Statistics

ANI Hit Rate—Number of on calls that Ensemble was able to route based on ANI/Total inbound calls (real time).

DNIS Routing Rate—Number of inbound calls that Ensemble was able to route based on DNIS/Total inbound calls (real time).

Customer Profile dbase (CPdb) outing Rate—Number of inbound calls that Ensemble was able to route based on information contained in the CPdb/Total inbound calls (real time).

Legacy Host Look-Up Routing Rate—Number of in calls that Ensemble was able to route based on information contained in call center's Legacy Host dbase/Total inbound calls (real time).

IVR Routing Rate—Number of in calls that Ensemble was able to route based on information gathered when call was handled by IVR/Total in calls (real time).

IVR Statistics

IVR Calls—Number of calls handled by the IVR (near real time).

Total Time In IVR—The amount time the IVR handled the inbound call (near real time).

IVR Abandon Calls—Number of calls that abandon will handled by the IVR (near real time).

Percentage of IVR Abandon Calls—Number of calls that abandon while handled by the IVR/Total IVR calls (near real time).

Total Time In IVR Before Abandon—The amount of time that the IVR was handling the call before the call aborted (near real time).

IVR Transfers—Number of calls that enter the IVR and for some reason caller requested to be transferred to a live agent (near real time).

Percentage of IVR Abandon Calls—Number of calls that enter the IVR.

Total Time In IVR Before Transfer—The amount of time the IVR handled the inbound call before the IVR transferred the call (near real time).

IVR Success Rate—Number of IVR calls that resulted in a successful transaction, such as prompted caller for their SS# and transferred the call to agent pool or handled the inbound call without transferring the call to an agent. A successful transaction is a termination code that is assigned as "Success", similar to terminations code that are classified as contacts in the outbound world (near real time).

IVR Termination Codes—An individual termination code sent to Davox indicating that disposition of each call within the IVR.

Figure 12:
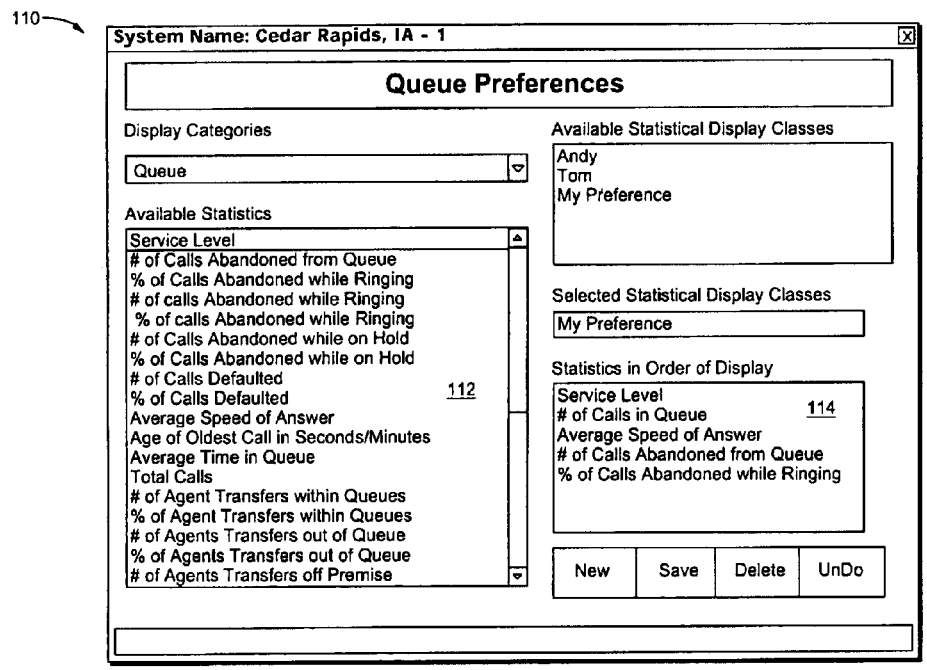
Figure 13:
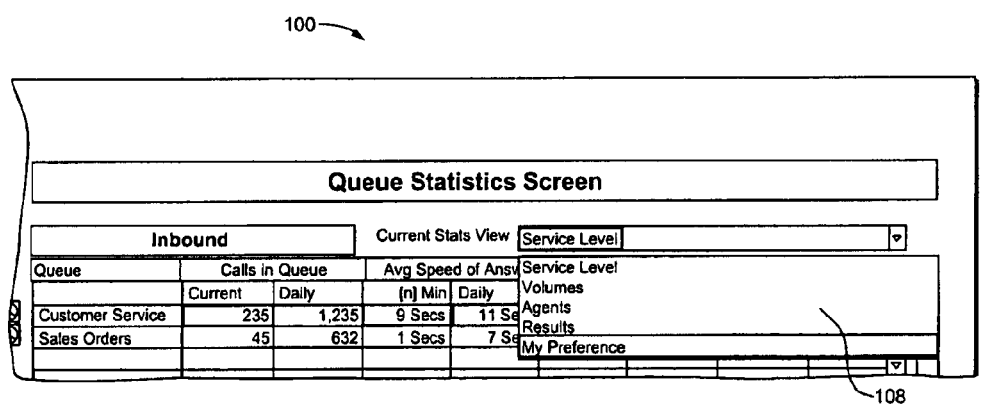
Figure 14:
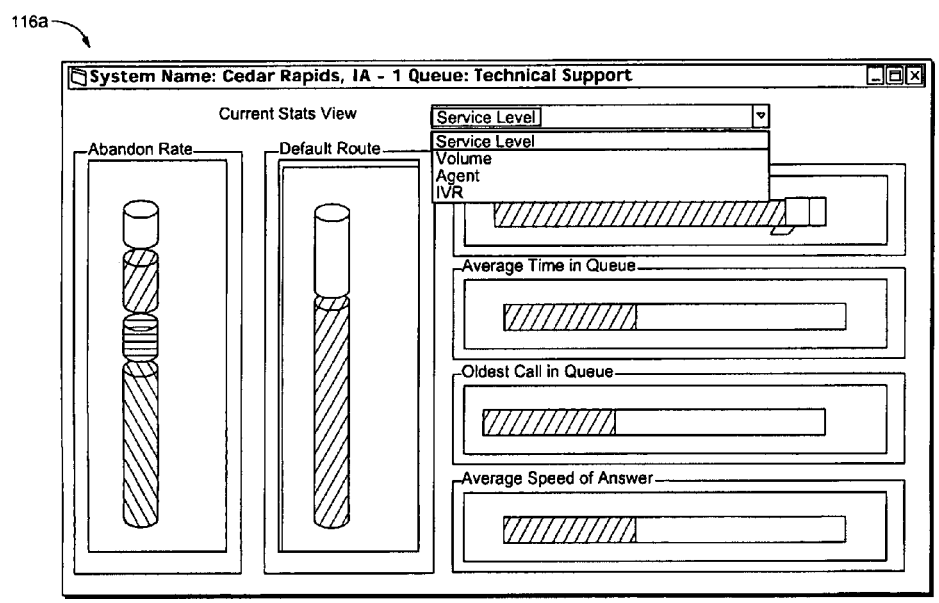
Figure 15:
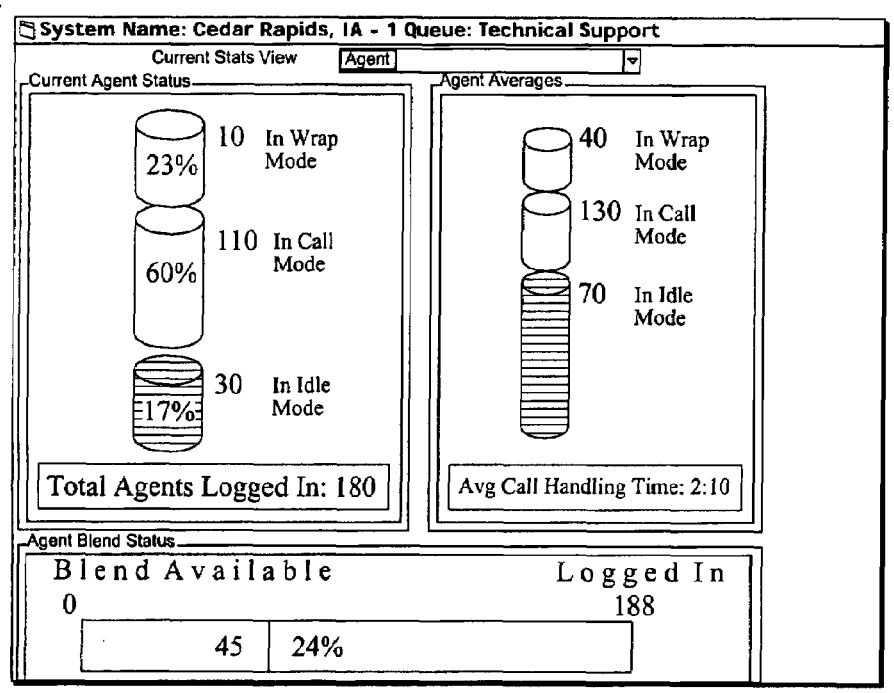

The statistics display manager 64 also allows the user to define preferences for one or more user-defined viewing options. A preference window 110, FIG. 12, presents a list of available statistics in an available statistics region 112 (e.g., a list box). The user can begin a new viewing option, define an alphanumeric name for the viewing option, select the desired statistics from the available statistics region 112, and arrange the statistics in an order of display region 114 of the preference window 110. The user can save the user-defined preference and the user-defined preference then becomes one of the viewing options available to the user in the drop down list 108 on the queue statistics screen 100, FIG. 13. Within each viewing option, the user can also resort the data presented in each row based upon the column header selection (ascending, descending).

The exemplary agent statistics screen 120 also presents the viewing options in a drop down list 126 such that the user can select a viewing option and view the agent's performance based on different classes. The agent statistics categories or classes include, but are not limited to, time, volume of calls, results and agent efficiency. Examples of the agent statistics within each of the classes are as follows:

Time Statistics

State—Displays the current agent state Out Talk, Out Idle, Out Wrap, In Talk, In Idle, In After Call Work, Email Correspondence, Web Chart (real time update).

Logged In—Agent's total time logged into the system (near real time).

Total Talk—Agent's total talk time for all tasks (near real time).

Total Idle—Agent's total time spent in idle state for all tasks (near real time).

Total After Call Work—Agent's total time spent in After Call Work state for all task (near real time).

Total Aux Work—Agent's total time spent in Aux Work state (near real time).

Percentage of Agent Time Working Inbound—Agent's total time handling outbound calls/Logged In Time (near real time).

Percentage of Agent time Working Outbound—Agent's total time handling outbound calls/Logged In Time (near real time).

Percentage of Agent Time Working Email—Agent's total time handling E-mails/Logged In Time (near real time).

Outbound Talk—Agent's total talk time when handling outbound calls (near real time).

Outbound Idle—Agent's total idle time when handling outbound calls (near real time).

Outbound After Call Work—Agent's total time spent in After Call Work state for outbound calls (near real time).

Inbound Talk—Agent's total talk time when handling inbound calls (near real time).

Inbound Idle—Agent's total idle time when handling inbound calls (near real time).

Inbound After Call Work—Agent's total time spent in After Call Work state for inbound calls (near real time).

Email Correspondence—Agent's total time spent corresponding to E-mails (near real time).

Web Chat Time—Agent's total time spend interacting with customers via Web Chat (near real time).

Scheduled Break 1—Total time agent spent on break 1 (near real time).

Scheduled Break 2—Total time agent spent on break 2 (near real time).

Scheduled Break 3—Total time agent spent on break 3 (near real time).

Volume Statistics

Total Calls—Number of calls that were delivered to the agent for all Tasks (real time).

Inbound Calls—Number of inbound calls that were delivered to the agent (real time).

Outbound Calls—Number of outbound calls that were delivered to the agent (real time).

E-mails'—Number of E-mails that were delivered to the agent (real time).

Percentage of Inbound Calls Worked—Number of inbound calls that were delivered to the agent/Total Calls (real time).

Percentage of Outbound Calls Worked—Number of outbound calls that were delivered to the agent/Total Calls (real time).

Percentage of E-mails Worked—Number of E-mails that were delivered to the agent/Total Calls (real time).

Number of Inbound Calls Transferred Within Queue— Number of inbound calls that the agent transferred within the queue (real time).

Percentage of Inbound Calls Transferred Within Queue— Number of inbound calls that the agent transferred within the queue/Total inbound calls (real time).

Number of Inbound Calls Transferred Out of the Queue— Number of inbound calls that the agent transferred out of the queue (real time).

Percentage of Inbound Calls Transferred Out of Queue— Number of inbound calls that the agent transferred out of queue/Total inbound calls (real time).

Percentage of Inbound Calls Transferred—Number of inbound calls that the agent transferred/Total inbound calls (real time).

Number of Inbound Calls Transferred Off premise— Number of inbound calls that the agent transferred off premise (real time).

Percentage of Inbound Calls Transferred Off Premise— Number of inbound calls that the agent transferred off premise/Total inbound calls (real time).

Number of Outbound Calls Transferred—Number of outbound calls that the agent transferred (real time).

Percentage of Outbound Calls Transferred—Number of calls that the agent transferred/Total outbound calls (real time).

Results Statistics

Conversion Rate—Number of calls that result in 'N's termination codes, where 'N' is defined by the customer/ Total calls—'N's result codes (real time).

Total 'N' Results—Number of calls that result in 'N' termination codes, where 'N's is defined by the customer. 'N' can be one or multiple result codes. Groupings to be defined by the customer (real time).

'N' Results Per Agent Hour—Total results/Agent hours (real time).

Total Dollars—Dollars assigned to total results. Dollars will be definable by the user by result code. The field will be populated at call completion by the agent client software (real time).

Dollars Per Agent Hour—Total dollars/agent hours (real time).

Figure 19:
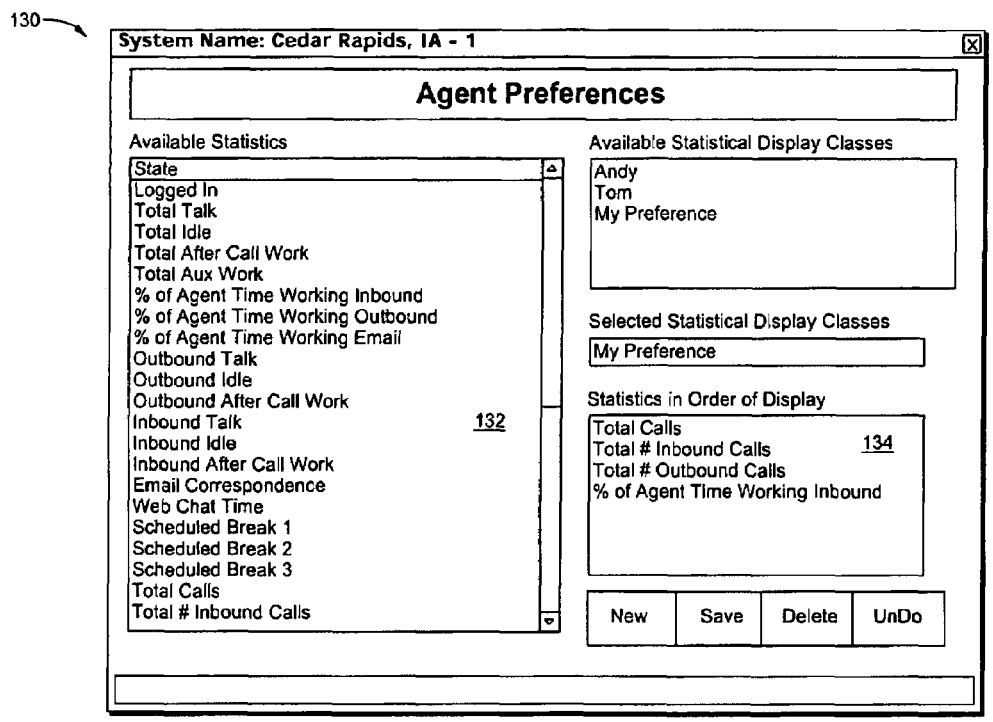
Figure 20:
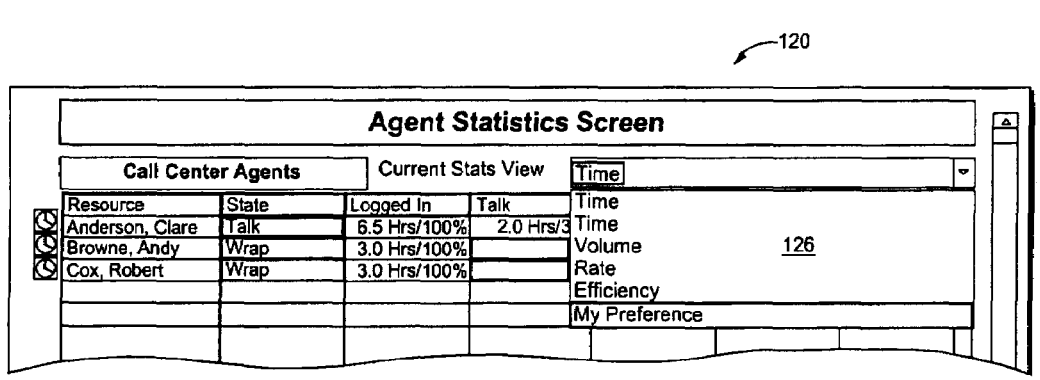
Figure 21:
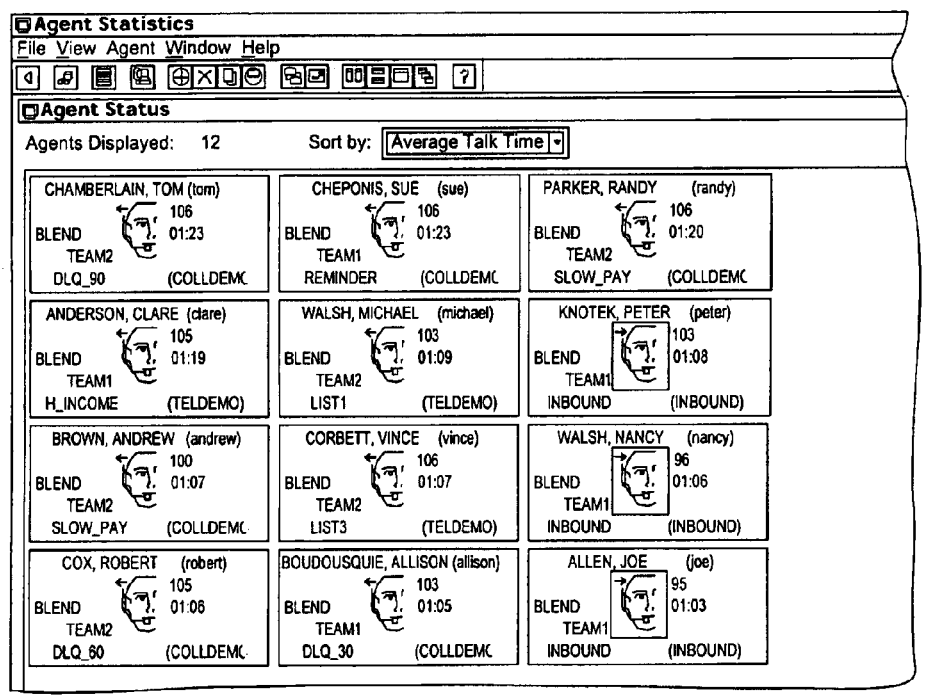

The user can also define agent statistics viewing options using a preferences window 130, FIG. 19. The preferences window 130 presents a list of available statistics in an available statistics region 132 (e.g., a list box). The user can begin and name a new viewing option preference, select statistics to be included in that preference from the available statistics, and arrange the statistics in an order of display region 134 of the preferences window 130. The user-defined viewing option can then be saved and presented in the drop down list 126 of the agent statistics window 120, FIG. 20.

The method of organizing and presenting statistics also presents view format options corresponding to the level of detail and format of the statistics, step 314. Upon receiving a user selection of one of the view format options, the statistics data is displayed in the user selected view format, step 316.

Figure 11:
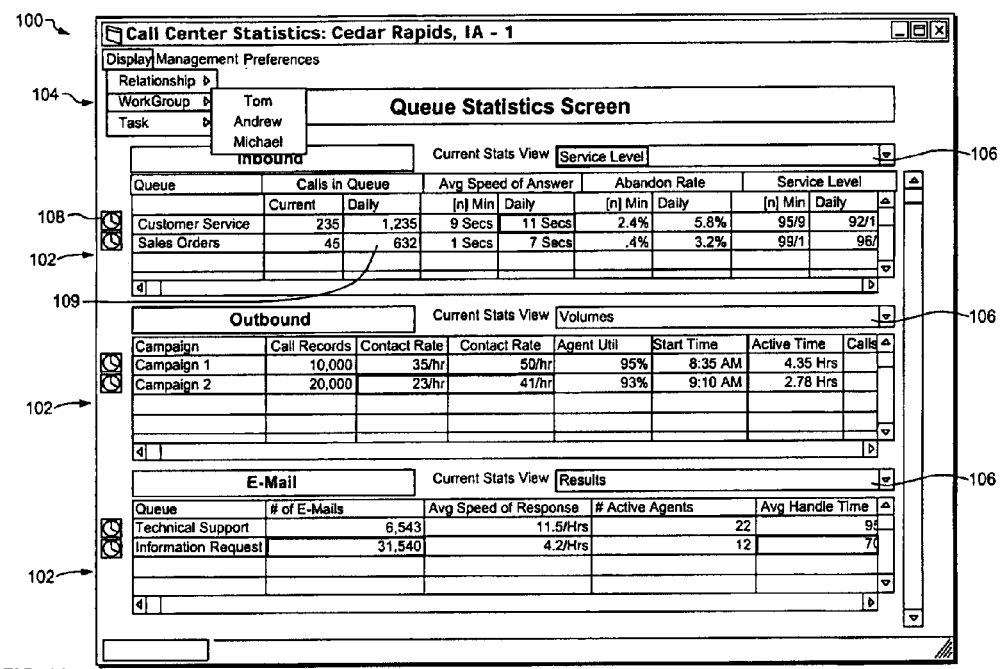
FIGS. 11–17 are screen shots of the user interface for the queue statistics display, according to one embodiment of the present invention.

In the exemplary embodiment, the queue statistics interface provides two basic view formats or levels of statistical information, summary and detail. The queue statistics summary screen 100 (as shown in FIG. 11) provides a global view of all activity in the call center. The statistics detail screens 116, FIGS. 14–17, provide an in-depth view into a specific call center task in a graphical format. The queue statistics summary screen 100 preferably includes icons 108 associated with statistics, for example, associated with each queue within the inbound tasks and with each campaign within the outbound tasks. The icons 108 provide a link to the queue statistics detail screens 116 for the associated statistics.

Figure 16:
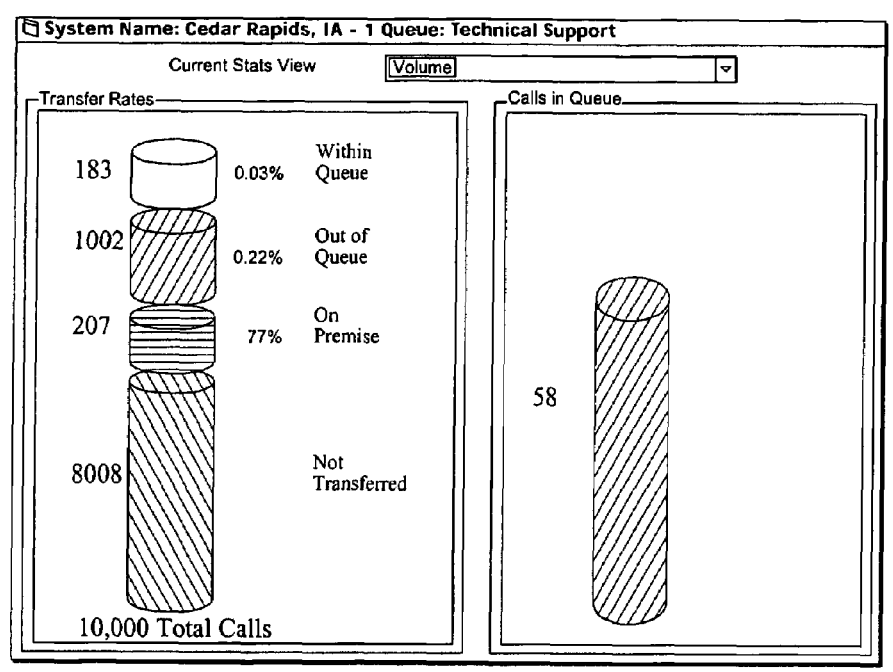
Figure 17:
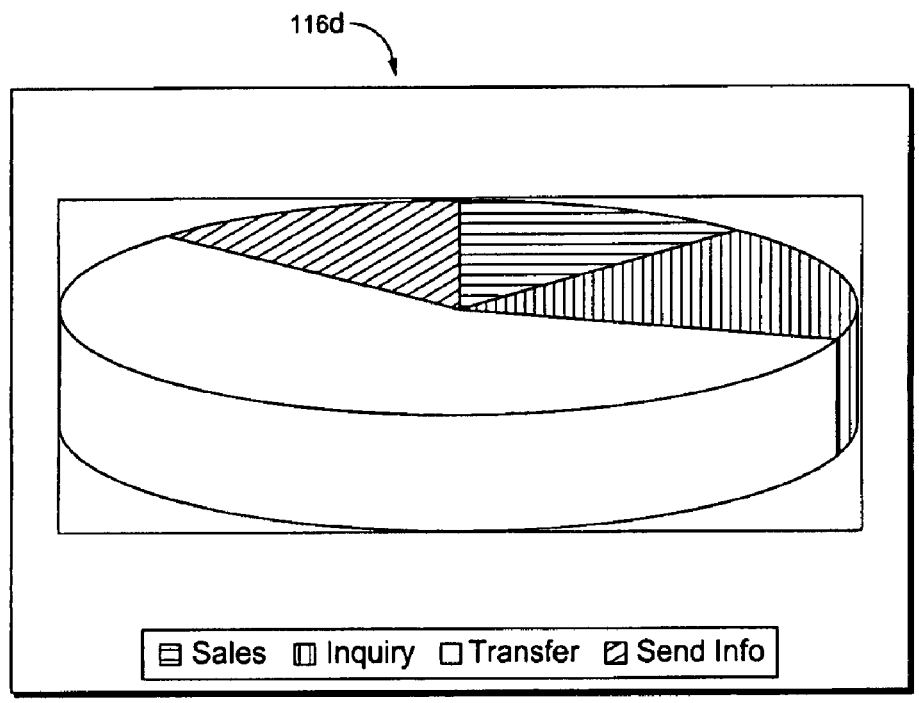
Figure 18:
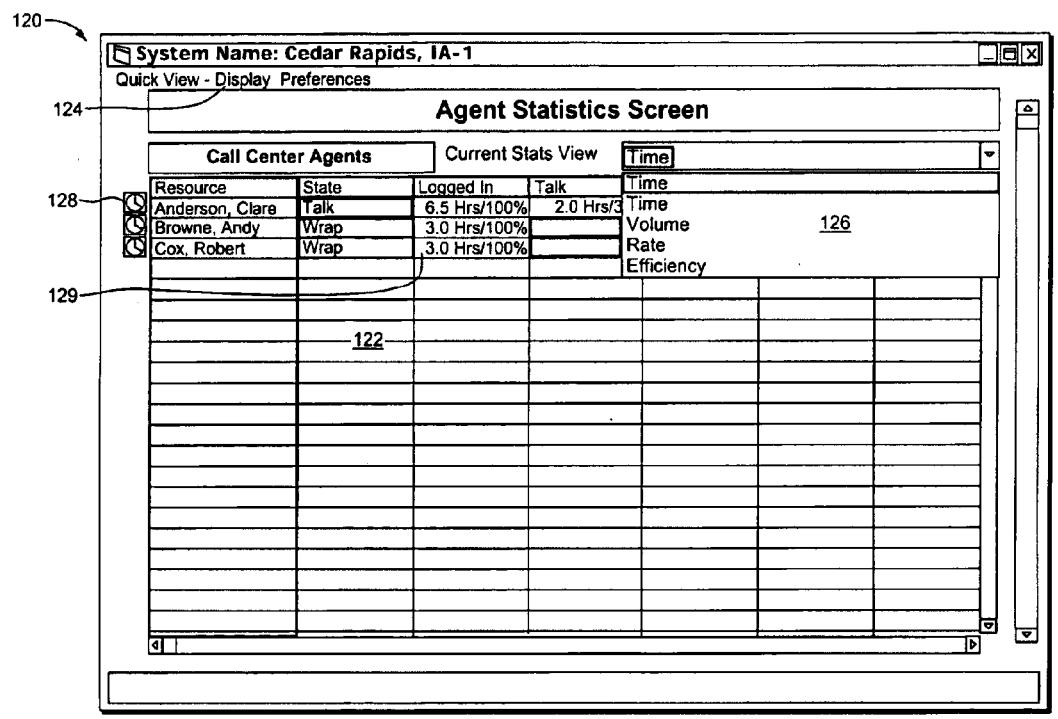
FIGS. 18–22 are screen shots of the user interface for the agent statistics display, according to one embodiment of the present invention.

When the detail graphic icon 108 is selected for a particular queue or campaign, the detail information for that queue or campaign will be displayed in a graphical format in separate queue statistics detail screens 116a–116d (FIGS. 14–17). The queue statistics detail screens 116a–116d initially display graphical representations of the statistics according to the viewing option set in the summary queue statistics window 100. Within each of the queue statistics detail screens 116a–116d, the user can change the viewing option and the statistics and graphical format will change accordingly. For example, the service level viewing option is shown in the window 116a (FIG. 14), the agent viewing option is shown in the window 116b (FIG. 15), and the volume viewing option is shown in window 116c (FIG. 16).

In the exemplary embodiment, the agent statistics interface also provides different view format options having different levels of detail and different data formats. A quick view agent statistics screen 136, FIG. 21, allows the user to view the overall performance of the agents including the task (e.g., inbound, outbound, Email, chat) a specific agent has logged into and the login state. Login states include, but are not limited to, logged in, ready waiting for work, after call work, busy, break, paid break, and logged out. The quick view agent statistics screen 136 can also display color codes to indicate the task and login state of each agent.

Figure 22:
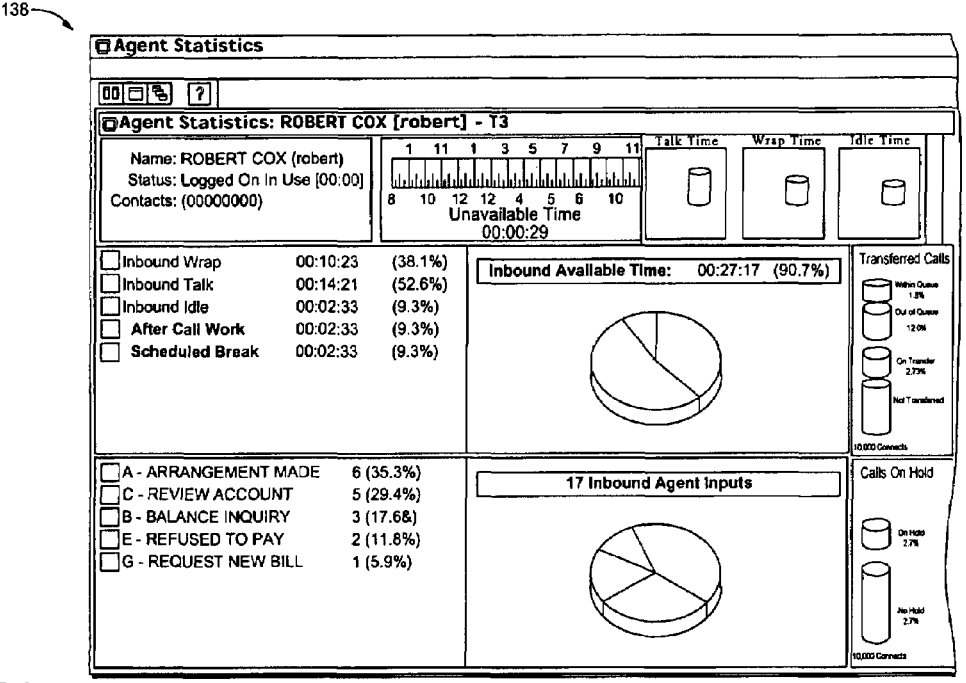

A detail view agent statistics screen 138, FIG. 22, displays statistics for a specific agent in graphical format. The agent statistics summary screen 120 preferably includes icons 128 associated with each agent. Activating the icons 28 opens the detail view format screen 138 associated with that agent.

For both queue and agent statistics, multiple statistics windows or screens can be opened simultaneously with different display options, viewing options, and/or view format options selected for each window.

One method of monitoring statistics, according to the present invention, is illustrated in FIG. 7. According to this method, the statistics collected by the call center are compared to the user-defined goal thresholds in a strategy profile, step 320. If one of the user-defined thresholds is not being met, step 322, an indication is provided in the region of the statistics interface containing the statistics that fail to meet the user-defined threshold, step 324.

According to the exemplary embodiment, the statistics are displayed within cells 109 in the queue statistics window 100. If an established goal is not being met, the cell for that particular statistic element will change colors notifying the user that the call center is not meeting a user-defined goal threshold that applies to that statistic element. Different colors can also be used to indicate when the statistics are within the optimization minimum or optimization maximum. Thus, the user is informed of the approach, realization, and exceeding of the goal associated with that statistic.

The exemplary agent statistics screen 120 also displays each statistic element in a separate cell 129. If an agent is not meeting an established goal, the cell 129 for the agent statistic element will change colors notifying the user that the agent is not meeting the user-defined goal.

Accordingly, the present invention provides an interactive call center management system that provides an interpretive view of the call center data and that permits a call center manager to define relationships between call center resources, to define strategies and goals, to define a series of actions to take place when the goals are met.

Modifications and substitutions by one of ordinary skill in the art are considered to be within the scope of the present invention which is not to be limited except by the claims which follow.

What is claimed is:

1. A computer-implemented method of managing a call center using relationships, said call center including a plurality of different resources for handling telephone calls and communication contacts, said method comprising:

establishing call center resource data corresponding to said plurality of different resources available within said call center;

presenting to a user said plurality of different resources defined by said resource data;

receiving user selections of selected resources from said plurality of different resources presented to said user;

assigning said selected resources to a relationship profile;

assigning a relationship key field corresponding to said relationship profile to said call center resource data for each of said selected resources assigned to said relationship profile; and using said relationship key field to manage said call center; wherein said call center resource data is organized by function into a plurality of resource categories, further including the steps of:

presenting to said user said plurality of resource categories;

presenting a user with a plurality of statistics display options corresponding to a plurality of resource relationship profiles;

receiving a user selection of a selected statistics display option corresponding to a selected resource relationship profile;

obtaining call center statistics from said plurality of resources having a matching resource relationship key field matching a selected resource relationship key field of said selected resource relationship profile;

displaying said call center statistics from said plurality of different types of resources having said matching resource relationship key field;

receiving a user selection of a selected resource category, wherein said plurality of resources within said selected resource category are presented for selection by said user; and wherein said plurality of resource categories include inbound dialed number identification service (DNIS), queues, agent workgroups, individual agents, campaigns, and call tables.

2. A computer-implemented method of managing a call center using relationships, said call center including a plurality of different resources for handling telephone calls and communication contacts, said method comprising:

establishing call center resource data corresponding to said plurality of different resources available within said call center;

presenting to a user said plurality of different resources defined by said resource data;

receiving user selections of selected resources from said plurality of different resources presented to said user;

assigning said selected resources to a relationship profile;

assigning a relationship key field corresponding to said relationship profile to said call center resource data for each of said selected resources assigned to said relationship profile; and using said relationship key field to manage said call center;

obtaining call center statistics from said plurality of resources having a matching resource relationship key field matching a selected resource relationship key field of said selected resource relationship profile;

displaying said call center statistics from said plurality of different types of resources having said matching resource relationship key field;

wherein said relationship key field is used to control defining of call center strategies.

3. A computer-implemented method of managing strategies and actions in a call center, said method comprising:

establishing action detail data defining generic actions that can be taken in said call center;

establishing goal data defining goals that can be set within said call center;

presenting to a user said generic actions defined by said action detail data;

receiving at least one user selection of a selected generic action from said generic actions;

displaying action detail data for said selected generic action;

receiving user-defined action detail data specific to said call center;

adding said user defined action detail data to said generic action detail data to create an available action;

presenting to said user said goals defined by said goal data;

receiving at least one user selection of a selected goal from said goals;

receiving at least one user-defined threshold for said selected goal;

receiving a user selection of at least one selected available action from said available actions;

assigning said at least one selected available action to said at least one user-defined threshold for said selected goal such that said selected available action occurs when each said at least one user-defined threshold is reached;

obtaining call center statistics from a plurality of different types of call center resources having a matching resource relationship key field;

creating a graphical user interface for presenting said call center statistics from said plurality of different types of resources having said matching resource relationship key field.

4. The method of claim 3 wherein said at least one user-defined strategy threshold includes multiple levels of user-defined strategy thresholds, and wherein at least one of said available actions is selected and assigned to each of said user-defined strategy thresholds.

5. The method of claim 4 wherein said multiple levels of strategy thresholds include an optimization minimum, an optimization realization, and an optimization maximum.

6. The method of claim 3 wherein said goals are organized in goal categories, and further including the step of:

presenting said goal categories to said user;

receiving a user selection of a selected goal category from said goal categories, wherein said goals within said selected goal category are presented for selection by said user.

7. The method of claim 3 wherein a plurality of selected goals, user-defined thresholds, and selected available actions are received and assigned to create at least one strategy profile.

8. The method of claim 7 wherein a library of strategy profiles are created such that said user can select a strategy profile from said library of strategy profiles depending upon a desired strategy to be implemented in said call center.

9. The method of claim 3 wherein a plurality of available actions are created.

10. A method of monitoring and presenting call center statistics in a call center, said method comprising:

establishing a plurality of resource relationship profiles defining a plurality of relationships between different types of call center resources;

assigning a relationship key field corresponding to said resource relationship profile to call center resource data for each of said call center resources assigned to said relationship profile;

establishing a plurality of call center strategy profiles defining a plurality of call center strategies, each of said call center strategies including a plurality of goals having at least one user-defined strategy threshold;

receiving call center statistic data pertaining to said call center resources;

presenting a user with a plurality of statistics display options corresponding to said resource relationship profiles;

displaying said call center statistics data pertaining to said call center resources assigned to said resource relationship profile corresponding to a selected statistics display option selected by a user from said plurality of statistics display options; and providing an indication when said user-defined strategy threshold of one of said plurality of goals has not been reached.

11. The method of claim 10 wherein said call center statistics data includes call center queue statistics data.

12. The method of claim 11 wherein said call center queue statistics data is organized and displayed according to call center tasks.

13. The method of claim 12 wherein said call center tasks include inbound, outbound, e-mail and web chat.

14. The method of claim 12 wherein said queue statistics data is further organized and displayed according to task classes within each of said call center tasks, and further including the steps of:

presenting said user with a plurality of task statistics viewing options corresponding to each of said task classes, wherein said contact statistics data within at least one of said task classes corresponding to a selected task statistics viewing option is displayed.

15. The method of claim 14 further including the steps of:

presenting said user with task statistic viewing option preferences, allowing said user to create a user-defined task statistics viewing option.

16. The method of claim 14 wherein said task classes include service level, volumes, agent, results, routing and IVR.

17. The method of claim 10 further including the step of:

presenting said user with a plurality of view formats pertaining the level of detail and format of said call center statistics data to be displayed.

18. The method of claim 17 wherein said view formats include a summary statistics format and a detailed graphical statistics format.

19. The method of claim 10 wherein said indication includes a change in color of a display region containing said call center statistics data corresponding to said one of said plurality of goals in which said user-defined threshold has not been reached.

20. The method of claim 10 wherein said call center statistics data includes call center agent statistics data organized and displayed according to agents.

21. The method of claim 20 further including the steps of:
presenting said user with a plurality of statistics viewing options corresponding to the type of agent statistics to be displayed when a selected statistics viewing option is displayed.

22. A call center resource relationship management system for use in a call center, said call center including a plurality of different resources used for handling telephone calls, said system comprising:
call center resource data defining a plurality of different types of call center resources in said call center; and
a relationship manager, responsive to a user input, for accessing said call center resource data, for creating a graphical user interface presenting said plurality of different call center resources defined by said call center resource data to said user, for assigning user-selected resources to a relationship profile, and for associating a relationship key field to said call center resource data corresponding to each of said user-selected resources, for obtaining call center statistics from said plurality of different types of call center resources having a matching resource relationship key field matching a selected resource relationship key field of said selected resource relationship profile, for creating a graphical user interface for presenting said call center statistics from said plurality of different types of resources having said matching resource relationship key field;
wherein said plurality of different call center resources are organized into resource functional categories including agents, agent workgroups, devices, queues, applications, campaigns, and call tables.

23. The system of claim 22 wherein said system is implemented on at least one personal computer utilizing a WINDOWS-based operating system.

24. A call center strategy and action management system for use in a call center, said system comprising:
action detail data defining a plurality of generic actions that can be taken within said call center;
an action builder, responsive to a user input, for accessing said action detail data, for creating a graphical user interface presenting said generic actions to a user for selection, for combining user-defined specific action details with user-selected generic actions to build user-defined available actions in said call center;
goal data defining goals to be achieved within said call center; and
a strategy manager, responsive to user input, for accessing said goal data, for creating a graphical user interface presenting said goals and said available actions to said user for selection, and for assigning at least one user-defined threshold to a user-selected goal and for assigning at least one user-selected available action to said user-defined threshold such that said user-selected available action will occur when said user-defined threshold is met, for obtaining call center statistics from said plurality of different types of call center resources having a matching resource relationship key field matching a selected resource relationship key field of a selected resource relationship profile, for creating a graphical user interface for presenting said call center statistics from said plurality of different types of resources having said matching resource relationship key field.

25. The system of claim 24 wherein said goals are organized according to goal categories including at least one of system event goals, service level goals, volume goals, agent goals, device goals and time of day goals.

26. The method of claim 24 wherein said at least one user defined threshold includes multiple thresholds including an optimization minimum, an optimization realization, and an optimization maximum.

27. The system of claim 26 wherein a user-selected available action is assigned to each of said multiple thresholds.

28. The system of claim 24 wherein said generic actions include at least one of send message, e-mail notification, pager notification, purge logs, move resources to queue, recycle device, set statistic color, notification, log, select combination termination codes, and run automation script.

29. A call center management system for managing a call center including a plurality of different resources used for handling telephone calls, comprising:
call center resource data defining a plurality of call center resources in said call center;
a relationship manager, responsive to a user input, for accessing said call center resource data, for creating a graphical user interface presenting said plurality of different types of call center resources defined by said call center resource data to said user for selection, for assigning user-selected resources to a relationship profile, and for associating a relationship key field to said call center resource data corresponding to each of said user-selected resources;
action detail data defining a plurality of generic actions that can be taken within said call center;
an action builder, responsive to a user input, for accessing said action detail data, for creating a graphical user interface presenting said generic actions to a user for selection, for combining user-defined specific action details with user-selected generic actions to build user-defined available actions in said call center;
goal data defining goals to be achieved within said call center;
a strategy manager, responsive to user input, for accessing said goal data, for creating a graphical user interface presenting said goals and said available actions to said user for selection, and for assigning at least one user-defined threshold to a user-selected goal and for assigning at least one user-selected user-defined available action to said user-defined threshold such that said user-selected user-defined available action will occur when said user-defined threshold is met; and
statistics data representing statistics pertaining to resources in said call center; and
a statistics display manager, responsive to user input, for monitoring said statistics and for creating at least one graphical user interface displaying said statistics in at least one user-defined format, wherein said statistics display manager accesses said strategy profiles, compares said statistics with said at least one user-defined threshold, and provides an indication in said graphical user interface when said threshold has not met.

30. The call center management system of claim 29 wherein said user-defined format is based upon one of said relationship profiles.

31. The system of claim 29 wherein said system is implemented on at least one personal computer utilizing a WINDOWS-based operating system.

* * * * *